US006589633B1

(12) United States Patent
Ino et al.

(10) Patent No.: US 6,589,633 B1
(45) Date of Patent: Jul. 8, 2003

(54) INK-RECEPTIVE FIBROUS MATERIAL FOR ADVERTISEMENT

(75) Inventors: Kazuhide Ino, Satte (JP); Kenji Suzuki, Tokyo (JP)

(73) Assignee: Hiraoka & Co., Ltd., Tokyo (JP)

( * ) Notice: Subject to any disclaimer, the term of this patent is extended or adjusted under 35 U.S.C. 154(b) by 0 days.

(21) Appl. No.: 09/342,099

(22) Filed: Jun. 29, 1999

(30) Foreign Application Priority Data

Jun. 30, 1998 (JP) .......................................... 10-184321
Aug. 28, 1998 (JP) .......................................... 10-243329
Apr. 28, 1999 (JP) .......................................... 11-122002

(51) Int. Cl.$^7$ .................................................. B32B 3/00
(52) U.S. Cl. ...................................................... 428/195
(58) Field of Search ................................ 428/195, 212, 428/323, 331

(56) References Cited

U.S. PATENT DOCUMENTS 4,701,837 A * 10/1987 Sakaki et al. ............ 346/135.1
5,041,328 A * 8/1991 Akiya et al. ................ 428/212
5,660,622 A * 8/1997 Nikoloff ..................... 428/211
5,663,004 A * 9/1997 Malhotra et al. ........... 428/500
5,679,451 A 10/1997 Kondo et al.
5,714,245 A 2/1998 Atherton et al.
5,747,146 A 5/1998 Kashiwazaki et al.
5,759,673 A 6/1998 Ikezawa et al.
5,853,899 A * 12/1998 Anderson et al. ........... 428/507
5,885,678 A 3/1999 Malhotra .................... 428/41.8
RE36,303 E * 9/1999 Ogawa et al. .............. 428/341
6,071,611 A * 6/2000 Ohta et al. ................... 428/343
6,150,005 A * 11/2000 Williams ..................... 428/141
6,245,422 B1 * 6/2001 Onishi et al. ............... 428/331

FOREIGN PATENT DOCUMENTS

EP 199874 A1 11/1986
JP 59-54592 3/1984
JP 60-204390 10/1985
JP 60-248387 12/1985
JP 61-141584 6/1986
JP 61-209190 9/1986
JP 5193275 A 8/1993
JP 5-201119 8/1993
JP 7-9757 1/1995
JP 7-17129 1/1995
JP 7-61116 3/1995
JP 8-34160 2/1996
JP 8-52937 2/1996
JP 8-67065 3/1996
JP 8-230313 9/1996
JP 9-99637 4/1997

* cited by examiner

*Primary Examiner*—Bruce H. Hess
*Assistant Examiner*—Michael E. Grendzynski
(74) *Attorney, Agent, or Firm*—Arent Fox Kintner Plotkin & Kahn

(57) ABSTRACT

A sheet material for advertisement having high water resistance and durability for practice and optionally high flameproof property and mildewproof property and capable of recording thereon ink images having a high clarity under transmitted light by ink jet printing, has an ink receiving layer which is formed on a sheet substrate comprising a base fiber fabric and a synthetic resin-containing coating layer, which optionally has a flameproof and/or mildewproof property, and which comprises hydrated silica particles (having an average primary particle size of 20 to 35 nm an average secondary particle size of 2 to 7 $\mu$m and a BET specific surface area of 50 to 170 $m^2/g$, a water-holding material, for example, three dimensionally cross-linked isocyanate-polyalkyleneoxide and isocyanate-N-vinyl acetamide copolymers and/or copolymers or reaction products of ethyleneoxide (65% by weight or more) with a modifying organic compound, an acrylic resin binder, and optionally a phosphate ester compound flame retarder and/or mildewproofing agent.

23 Claims, No Drawings

INK-RECEPTIVE FIBROUS MATERIAL FOR ADVERTISEMENT

BACKGROUND OF THE INVENTION

1. Field of the Invention

The present invention relates to a sheet material for an advertisement. Particularly, the present invention relates to a sheet material for advertisement appropriate to recording ink images with a high quality by an ink jet printing method. More particularly, the present invention relates to a sheet material for advertisement which can display bright transmitted light images thereon by a internal lighting display system, and can optionally exhibit high flame retarding property, water resistance, a mildewproof property and sufficient durability for practical use.

Further, the present invention relates to a sheet material for advertisement usable as an outdoor advertisement sheet having a large surface area, a curing sheet for building and a decorating sheet, a hood sheet for truck, a sun-light shielding sheet, a shading tent and a hanging screen or sheet.

2. Description of the Related Art

Currently, an ink jet printer has become the object of public attention as a means for accurately and clearly recording images and photographs prepared and treated by a computer. Generally, in the ink jet printer, an aqueous ink having a low drying rate is employed to prevent the disadvantages in that the ink jetted through a nozzle is dried at the jetting end of the nozzle to cause the ink jetting nozzle to be blocked by the dried ink and to not work smoothly. When the aqueous ink is employed, however, falling of the ink in drops and dripping of the ink must be prevented, and thus an ink receiving surface of the ink jet recording material must exhibit a high ink-absorption and a high ink-drying rate. When the ink receiving layer has a low ink-absorption and the ink is dried at and fixed to a surface portion of the ink receiving layer, the resultant images displayed by the reflected light are sharp and clear. However, when the images are displayed by the light emitted from a light source located on the back side of the sheet on which the images are formed and transmitted through the sheet, the transmitted light-displayed images are disadvantageous in that the contours of the images are vague and the color density of the images is poor.

To obtain the ink images displayed by the transmitted light and having a high sharpness and clarity, the ink jet recording sheet must have an excellent ink-absorption in the direction of the thickness of the sheet and blotting and spreading of the printed ink dots along the surface plane of the recording sheet must be fully prevented or controlled.

There have been made attempts to enhancing the ink-absorption of the recording sheet and the resistance of the recording sheet to ink-blotting and spreading. Namely, Japanese Unexamined Patent Publication No. 60-248,387 discloses an ink jet recording material in which a water-absorbent material produced by a reaction of an isocyanate compound with a polyetherpolyol compound is used. This recording sheet is advantageous in the enhanced absorption of water in the aqueous ink. However, this recording sheet is disadvantageous in that the transmitted light-displayed images exhibit an unsatisfactory sharpness and clarity, the ink images have a poor water resistance and thus, when the printed sheet is placed in a high humidity condition, the ink receiving layer is peeled off from the substrate sheet, and the sharpness and clarity of the images are degraded.

To remove the above-mentioned disadvantages, it has been attempted to add a filler such as silica to the ink receiving layer. For example, Japanese Unexamined Patent Publication No. 8-67,065 discloses an ink receiving layer containing a quaternary ammonium salt compound and colloidal silica, and Japanese Unexamined Patent Publication discloses an ink receiving layer containing anhydrous silica. In the ink receiving layer of the former, since the colloidal silica particles are cationically charged, the agglomeration and connection of the silica particles with each other are difficult to control, the surface of the ink receiving layer cannot be formed into a microporous structure which contribute to enhancing the ink-absorption of the ink receiving layer, and the resultant ink images have a low sharpness and clarity when observed by the light transmitted through the recording sheet. Also, while the ink receiving layer of the former is appropriate to aqueous dye inks, aqueous pigment inks cannot form clear ink images on the ink receiving layer. Also, in the ink receiving layer of the latter, since the silica particles per se have a poor water-absorption, dripping and spreading of the ink applied to the ink receiving layer occur and thus sharp and clear ink images are difficult to record.

The sheet materials for advertisement must optionally have a high flame retardant property (a high flameproof property) and/or a high mildewproof property. When these properties are necessary, it is important that the necessary properties are attained without degrading the ink image recording property necessary for the sheet material for advertisement.

Particularly, when the sheet material is used as an outdoor advertisement sheet material at a high humidity, a generation of mildew may occur in addition to the usual problems such that the sharpness and clarity of the recorded images are degraded and the ink receiving layer is peeled off from the substrate sheet. To remove these disadvantages, it is known to add an organic mildewproofing agent and/or an inorganic mildewproofing agent to the ink receiving layer. The addition of the organic mildewproofing agent can effectively control the generation of mildew only in an early period. The mildewproofing effect decreases with the lapse of time. Also, the inorganic mildewproofing agent is disadvantageous in poor weathering properties and endurance thereof.

SUMMARY OF THE INVENTION

An object of the present invention is to provide a sheet material for advertisement capable of recording thereon ink images having a high quality by an ink jet recording method.

Another object of the present invention is to provide a sheet material for advertisement capable of displaying clear images by an internal lighting apparatus in which the light is emitted from a light source located at the back side of the sheet material and is transmitted through the sheet material.

A further object of the present invention is to provide a sheet material for advertisement capable of recording ink images having high sharpness and clarity in a transmitted light display by an aqueous ink jet printing, while preventing a dripping and spreading of the aqueous ink, and having excellent weathering properties and endurance and optionally satisfactory flame-retardant (flameproof) property and/or mildewproof properties.

The above-mentioned object can be attained by the sheet material for advertisement of the present invention which comprises:

(A) a sheet substrate comprising at least one base fiber fabric; and (B) at least one ink receiving layer formed on at least one surface of the sheet substrate and comprising:

(a) hydrated silica particles having an average primary particle size of 20 to 35 nm, an average secondary particle size of 2 to 7 $\mu$m, and a BET specific surface area of 50 to 170 $m^2$/g, (b) a water-holding material having a water-absorption ratio in weight of the water-holding material saturated with water to the that free from water of 5 to 50, and (c) a binder comprising an acrylic resin.

In the sheet material for advertisement of the present invention, the sheet substrate (A) optionally further comprises a resinous coating layer formed on at least one surface of the base fiber fabric and comprising a synthetic resin.

In the sheet material for advertisement of the present invention, the base fiber fabric for the sheet substrate (A) preferably comprises at least one type of fibers selected from the groups consisting of natural organic fibers inorganic fibers, regenerated fibers, semi-synthetic fibers and synthetic fibers.

In the sheet material for advertisement of the present invention, the base fiber fabric for the sheet substrate is preferably one to which a flame retardant treatment has been applied.

In the sheet material for advertisement of the present invention, the base fiber fabric for the sheet substrate (a) preferably comprises at least one member selected from the group consisting of cotton fabrics and polyester fiber fabrics.

In the sheet material for advertisement of the present invention, the cotton fabric contained in the base fiber fabric for the sheet substrate (A) is preferably one to which a flame retardant treatment has been applied.

In the sheet material for advertisement of the present invention, the synthetic fibers for the base fiber fabric for the sheet substrate (A) are preferably selected from the flame retardant synthetic fiber group consisting of polyvinyl chloride fibers, polyvinylidene chloride fibers, fluorine-containing synthetic fibers, aramid fibers, novoloid fibers, polyarylate fibers, polybenzimidazole fibers, polyphenylene-triazole fibers, polyoxadiazole fibers, polyimide fibers, polyamideimide fibers, polyetherimide fibers, polyetheretherketone fibers, polyphenyleneoxide fibers, polyphenylenesulfide fibers, poly-p-phenylene benzobisoxazole fibers, and poly-p-phenylene benzobis-thiazole fibers.

In the sheet material for advertisement of the present invention, the regenerated fibers, semi-synthetic fibers and synthetic fibers for the base fiber fabric for the sheet substrate (A) optionally contain a flame retarder mixed into the fibers.

In the sheet material for advertisement of the present invention, the natural organic fibers, regenerated fibers, semi-synthetic fibers and synthetic fibers for the base fiber fabric for the sheet *substrate (A) are optionally those to which a flame retardant treatment has been applied.

In the sheet material for advertisement of the present invention, the base fiber fabric for the sheet substrate (A) optionally comprises at least one type of fiber selected from the flame retardant-modified fiber group consisting of flame retardant rayon fibers, flame retardant acrylic fibers, flame retardant water-insolubilized polyvinyl alcohol fibers, polychlal fibers, flame retardant polyester fibers, and flame retardant polyurethane fibers.

In the sheet material for advertisement of the present invention, the resinous coating layer for the sheet substrate (A) optionally comprises at least one member selected from flame retardant synthetic resins and mixtures of synthetic resins with flame retarders.

In the sheet material for advertisement of the present invention, the water-holding material (b) preferably comprises at least one member selected from the group consisting of:

(1) polymers produced by a reaction of isocyanate compounds with polyalkylene oxide compounds and having a three dimensionally cross-linked structure, (2) polymers produced by an addition polymerization reaction of isocyanate compounds with N-vinyl acetamide and having a three dimensionally cross-linked structure, and (3) modified polyalkyleneoxide resin comprising at least one member selected from copolymers and reaction products of 65% by weight or more of a polymeric component comprising at least one homopolymer or copolymer of at least one alkyleneoxide with 35% by weight or less of a modifying component comprising at least on organic compound component for modifying the polymeric component.

In the sheet material for advertisement of the present invention, the modified polyalkyleneoxide resin preferably comprises at least one member selected from the group consisting of:

(a) reaction products with ethyleneoxide polymers with hydrophobic organic compounds having at least one active hydrogen atom-containing group per molecule, (b) polyhydroxyl compounds produced by reaction of ethyleneoxide polymers with hydrophilic organic compounds having at least two active hydrogen atom-containing groups per molecule, (c) reaction products of the above-mentioned polyhydroxyl compounds (b) with at least one member selected from the group consisting of dicarboxylic acids, dicarboxylic anhydrides, lower alkyl esters of the above-mentioned dicarboxylic acids, and diisocyanate compounds, and (d) ethyleneoxide-propyleneoxide copolymers having a content of the copolymers having a content of the copolymerized polyethyleneoxide of 65 to 95% by weight and a weight average molecular weight of 200,000 or more.

In the sheet material for advertisement of the present invention, the ink receiving layer (B) optionally further comprises a flame retarder containing a phosphate ester compound.

In the sheet material for advertisement of the present invention, the phosphate ester-containing flame retarder preferably comprises an aromatic phosphate ester compound in the chemical structure of an oligomer.

In the sheet material for advertisement of the present invention, the sheet substrate (A) preferably comprises at least one member selected from the group consisting of (1) base fiber fabric comprising at least one type of fibers selected from the group consisting of flame retardant synthetic fibers, flame retarder-containing synthetic fibers and flame-retardant-treated synthetic fibers and flame retardant-treated base fiber fabrics, and (2) base fiber fabrics coated with a flame retardant resinous coating layer comprising at least one member selected from the group consisting of flame retardant synthetic resins and flame retarder-containing synthetic resins; and the ink receiving layer optionally further comprises, in addition to the hydrated silica particles, the water-holding material and the acrylic resin binder, a flame retarder comprising a phosphate ester compound.

In the sheet material for advertisement of the present invention, the ink receiving layer (B) optionally further comprises a mildewproofing agent.

In the sheet material for advertisement of the present invention, the flame retarder-containing ink receiving layer (B) optionally further comprises a mildewproofing agent.

In the sheet material for advertisement of the present invention, the resinous coating layer optionally further comprises a mildewproofing agent.

In the sheet material for advertisement of the present invention, the flame retardant resinous coating layer optionally further comprises a mildewproofing agent.

In the material for advertisement of the present invention, the base fiber fabric for the sheet substrate (A) optionally further comprises a mildewproofing agent.

In the sheet material for advertisement of the present invention, the flame retardant base fiber fabric further comprises a mildewproofing agent.

In the sheet material for advertisement of the present invention, the mildewproofing agent preferably comprises at least one member selected from the group consisting of mildewproofing imidazole compounds, thiazol compounds and triazol compounds.

In the sheet material for advertisement of the present invention,, the mildewproofing agent preferably comprises a composite comprising at least one member selected from the group consisting of mildewproofing imidazole compounds, thiazol compounds and triazole compounds with at least one inorganic metal and/or at least one inorganic compound.

DESCRIPTION OF THE PREFERRED EMBODIMENTS

The sheet material for advertisement of the present invention comprises a sheet substrate (A) comprising at least one base fiber fabric and at least one ink receiving layer (B) formed on at least one surface of the sheet substrate.

In the advertisement sheet substrate of the present invention, the base fiber fabric usable for the sheet substrate (A) is preferably selected from fabrics comprising at least one type of fibers selected from the group consisting of organic natural fibers, for example, cotton fibers and linen fibers; inorganic fibers, for example, glass fibers, carbon fibers and metal fibers; regenerated fibers, for example, viscose rayon fibers and cupra fibers; semisynthetic fibers, for example, cellulose di- and tri- acetate fibers and synthetic fibers, for example, nylon 6 fibers, nylon 66 fibers, polyester (for example, polyethylene terephthalate) fibers, aromatic polyamide fibers, acrylic fibers, polyolefin fibers and polyvinyl chloride fibers.

The synthetic fibers for the base fiber fabric are optionally selected from flame retardant synthetic fibers, for example, polyvinyl chloride fibers, polyvinylidene chloride fibers, fluorine-containing synthetic fibers, aramid fibers, novoloide fibers, polyarylate fibers, polybenzyimidazole fibers, polyphenylenetriazol fibers, polyoxadiazole fibers, polyimide fibers, polyamideimide fibers, polyetherimide fibers, polyetheretherketone fibers, polyphenyleneoxide fibers, polyphenylenesulfide fibers, poly-p-phenylene benzobisoxazole fibers and poly-p-phenylene benzobisthiazole fibers.

The above-mentioned types of fibers may be employed alone or in a mixture of to two or more different types of the fibers.

The regenerated fibers, semisynthetic fibers and synthetic fibers for the base fiber fabric for the sheet substrate (A) optionally contain a flame retarder mixed into the fibers. Also, the natural organic fibers, regenerated fibers, semisynthetic fibers and synthetic fibers for the base fiber fabric for the sheet substrate (A) may be ones to which a flame retardant treatment has been applied.

The flame retardant modified fibers as mentioned above include, for example, flame retardant rayon fibers, flame retardant acrylic fibers, flame retardant water-insolubilized polyvinyl alcohol (vinylon) fibers, polychlal fibers (comprising a polymeric blend of polyvinyl alcohol, polyvinyl chloride and a polyvinyl alcohol-polyvinylchloride graft polymer), flame-retardant polyester fibers, and flame retardant polyurethane fibers.

In the present invention, the flame retardant synthetic fibers usable for the base fiber fabric for the sheet substrate (A) include, for example, polyvinyl chloride fibers, for example, TEVILON™ (TEIJIN) and VICLON™ (KUREHA KAGAKU K.K.); polyvinylidene chloride fibers, for example, SARAN™; (ASAHI DOW K.K.) and KUREHARON™; fluorine-containing synthetic fibers, for example, TEFLON™ (DU PONT). TOYOFLON™ (TORAY); aramid fibers, for example, CONEX™ (TEIJIN) and KEVLER™ (DU PONT); novoloid fibers, for example, KYNOL™ (NIPPON KYNOL); polyarylate fibers, for example, VECTRAN™ (KURARAY); polybenzimidazol fibers, for example, PBI (CELLANESE); polyimide fibers, for example, CAPTON™ (DU PONT); polyamideimide fibers, for example, KERMEL (PHONE POULENE); polyetherimide fibers, for example PEI (TEIJIN); polyetheretherketone fibers, for example, PEEK (TEIJIN); polyphenyleneoxide fibers, for example, TENAX™ (AKZO); polyphenylenesulfide fibers, for example, KPS™ (KUREHA KAGAKU); and polyphenylene benzobisoxazole fibers, for example, ZYLON™ (TOYOBO).

Further, in the present invention, the flame retardant modified fibers usable for the base fiber fabric for the sheet substrate (A) include flame retardant rayon fibers, for example, BELL FLAME™ (KANEBO), which contained a phosphate-containing flame retardar blended therein; and TOVILEN™ (TOHO RAYON); flame retardant acrylic fibers, for example, KANEKALON™ (KANEGAFUCHI KAGAKU), RUFNEN™ (KANEBO), and EXLAN NX (TOYOBO); flame retardant vinylon fibers, for example, VINAL™ (KURARAY); polychlal fibers, for example, CORDELAN™, made by emulsion-polymerizing vinyl chloride in water in the presence of an emulsifying agent consisting of a polyvinyl alcohol, mix-spinning the polyvinyl chloride with a polyvinyl alcohol, and acetal-modifying the resultant fibers; flame polyester fibers, for example, TETRON ANFLA™ (TORAY), EXTER™ (TEIJIN), NANNEX™ (KURARAY), and HYM™ (TOYOBO), which are produced for example by mixing a flame retarder, for example, phosphate flame retarder in a polymerization stage.

In the base fiber fabric for the sheet substrate (A) of the present invention, a flame retardant property can be imparted to a non-flame retardant base fiber fabric by treating it with a flame retarder. The flame retarder usable for the present invention preferably comprises at least one member selected from flame retardant halogen compounds, phosphate ester compounds, phosphorus compounds, nitrogen compounds, boron compounds and sulfur compounds. These flame retardant compounds may be employed alone or after treating by dispersing them in an emulsion or solution containing a resinous binder, and by spraying the dispersion or immersing them in the dispersion.

The flame retardant halogen compounds include hexabromo-cyclododecane and tetrabromo-bisphenol A.

The flame retardant phosphate ester compounds include tributoxyethyl phosphate, trihexyl phosphate, tricresyl phosphate, tris(2,3-dibromopropyl)phosphate, tris(2,3-dichloropropyl)phosphate, tris(1,3-dichloropropyl) phosphate, tris(2-chloroethyl)phosphate, tris(2,4,6-tribromophenyl)phosphate, bis(β-chloroethyl) vinylsulphonate ester, and triaryl phosphate.

The flame retardant phosphorus compounds include orthophosphoric acid, ammonium phosphate, ammonium polyphosphate, urea phosphate, guanylurea phosphate, polyphosphorylamide, melamine phosphate, polyphosphorylamide ammonium, phosphoryltrianilide, phosphonitrile, tris(2-carbamoylethyl)phosphine, tris(2-carbamoylethyl) phosphineoxide, phosphorylamide, phosphineamide, and vinylphosphorin acid.

The flame retardant nitrogen compounds include trimethylol melamine and N-methylol acrylamide.

The flame retardant boron compounds include boric acid, boron phosphate and ammonium borate.

The flame retardant sulfur compounds include thiourea, ammonium sulfate and ammonium sulfamate.

Other flame retardant compounds include inorganic compounds such as antimony trioxide, antimony trichloride, zinc chloride and tin chloride.

The methods for the flame retardant treatment for cotton fabrics for the sheet substrate (A) include a PROVAN method in which the cotton fabrics are treated with tetrakis (hydroxymethyl)phosphonium chloride and ammonia gas; a Pyrovatex CP method in which N-methyloldimethyl phosphonopropionamide is employed together with trimethylolmelamine; a method in which the treatment is carried out by using a condensation product of bis(β-chloroethyl) vinyl-phosphonate with methyl phosphonate; and a treatment method using aminophosphazen. The flame retardant treatment method for the fibers and the base fabrics are not limited to those mentioned above, and the conventional flame retardant agents and methods can be applied for the present invention.

The fibers from which the base fiber fabrics are formed may be in the form of spun yarns of staple fibers, filament yarns, sprit yarns and/or tape yarns. The fabrics may be in the structure of woven fabrics, knitted fabrics or nonwoven fabrics or in composite structures of two or more thereof.

There is no limitation to the weave or knitting structures of the fabrics. For example, the base fiber fabrics include mesh woven and knitted fabrics formed from yarns including warp and weft yarns which a respectively arranged in parallel to each other and between which mesh pores are left, and non-mesh woven and knitted fabrics formed from yarns including warp and weft yarns which are respectively arranged in parallel to each other and between which substantially no gaps are left.

The mesh woven fabrics preferably has a basis weight of 30 to 700 $g/m^2{}_1$, and in the mesh woven and knitted fabrics, the proportion of the total area of the mesh pores based on the total surface area of the mesh fabrics is preferably about 10 to 95%. When the base fiber fabric is a non-mesh woven or knitted fabric, there is no limitation to the structure, basis weight and thickness of the fabric. Usually, the fabric is selected, in consideration of the use thereof, from plain weave fabrics, twill weave fabrics, tubular knitted fabrics, weft knitted fabrics, and warp knitted fabrics, and preferably has a basis weight of about 50 to 1,000 $g/m^2$.

There is no limitation to the mechanical strength of the base fiber fabrics usable for the present invention. When the sheet material of the present invention is used for large surface area tents or internal lighting advertisement boards in which are spread out for use under tension, preferably the sheet material has a tensile strength of 40 kgf/cm or more.

For the purpose of imparting a high water resistance and a water-absorption-preventing property, the base fiber fabrics are optionally subjected to a pre-treatment with a water-repellent agent. In the pre-treatment, the fabric is immersion treated or spray-treated with at least one of emulsions and solutions of waxes, mixtures of waxes with resin binders, and a silicone compound.

In the advertisement sheet material of the present invention, where an ink receiving layer is directly formed on the sheet substrate, the base fiber fabric for the sheet substrate is preferably selected from cotton fabrics and polyester fiber fabrics which have a light weight and an excellent draping property. Where the ink receiving layer is formed on a synthetic resin coating layer formed on the base fiber fabric for the sheet substrate, the polyester fiber fabrics having satisfactory mechanical strength and dimensional stability are preferably used as the base fiber fabric. When a high flame resistance is necessary in the advertisement sheet material, the base fiber fabric is preferably selected from cotton fabrics pre-treated with the flame retardant agent by the PROVAN treatment method, and flame retardant polyester fiber fabrics.

In the advertisement sheet material of the present invention, the base fiber sheet for the sheet substrate (A) is optionally coated on at least one surface thereof with a resinous coating layer comprising a synthetic resin.

The synthetic resin for the resinous coating layer formed on at least one surface of the base fiber fabric is not limited to a specific type of resin and is selected from, for example, polyvinyl chloride, polyurethanes, ethylene-vinyl acetate copolymers, ethylene-(meth)acrylate copolymers, polyethylene, polypropylene, polyesters, polyamides, fluorine-containing polymers, and silicone resins, in consideration of the purpose and use of the sheet material. To enhance the sharpness and clarity of the printed images on the ink receiving layer, the resinous coating layer is preferably colored in white color. However, when a white pigment, for example, titanium dioxide pigment, is contained in a large amount in the resinous coating layer, the transparency of the resinous coating layer is reduced and thus the clarity of the images observed through the light transmitted through the resinous coating layer may be degraded. When the resinous coating layer is formed on one or two surfaces of the base fiber fabric, the resultant sheet substrate preferably has a light transmittance of 5% or more.

To impart a high flameproofness, to the resinous coating layer, a flame retardant resin is used. The flame retardant resin can be selected from resins which per se exhibit a high flame retardant property, for example, fluorine-containing resins and silicone resins; and mixtures of resins which per se exhibit no flame retardant property, for example, polyvinyl chloride, polyurethanes, ethylene-vinyl acetate copolymers, ethylene-(meth)acrylate copolymers, polyethylene, polypropylene, polyesters and polyamides, with flame retarders capable of imparting a flame retardant property to the non-flame retardant resins, in consideration of the purpose and use of the sheet material. Where the flame retardant property is imparted, polyvinyl chloride resin is preferably employed as a non-flame retardant resin. In this case, the resultant polyvinyl chloride mixture are advantageous in a high flame retardant property, a high processability and a low price thereof.

To impart a flame retardant property to the synthetic resins, the conventional flame retarder-addition method can be employed. The flame retarder usable for the purpose preferably comprises one or more members selected from chlorine compounds, for example, chlorinated polyethylenes and chlorinated polypropylenes; bromine compounds, for example, decabromodiphenylether and hexabromobenzene;

phosphate ester compounds, for example, trimethyl phosphate, tri-2-ethylhexyl phosphate and tricresyl phosphate; and other inorganic compounds, for example, antimony trioxide, aluminum hydroxide, and magnesium hydroxide, in consideration of the purpose and use of the sheet material.

The resinous coating layer is optionally coated with an adhesive layer to enhance the adhesion of the sheet substrate to the ink receiving layer. The adhesive usable for forming the adhesive layer is preferably selected from melamine resins, phenol resins, epoxy resins, polyester resins, polyethyleneimine resins, polyisocyanate resins, polymethane resins, acrylic resins, polyamide resins, vinyl chloride-vinyl acetate copolymer resins, and ethylene-vinyl acetate copolymer resins, in consideration of the purpose and use of the sheet material and the type of the resins of the resinous coating layer.

In the advertisement sheet material of the present invention, the ink receiving layer formed on the sheet substrate, optionally on the resinous coating layer of the sheet substrate, comprises, as principal components, (a) hydrated silica particles having an average primary particle size of 20 to 35 nm, an average secondary particle size of 2 to 7 $\mu$m, and a BET specific surface area of 50 to 170 $m^2/g$, (b) a water-holding material having a water-absorption ratio in weight of the water-holding material saturated with water to that free from water of 5 to 50, and (c) a binder comprising an acrylic resin.

To form sharp and clear ink images on the ink receiving layer, the ink receiving layer must rapidly and sharply absorb the ink in the thickness direction thereof. Generally, a surfactant is contained in the ink for the purpose of enhancing the wetting property of the ink, promote spreading of the ink applied onto the surface of the ink receiving layer, in the direction along the surface of the ink receiving layer, and thus causes the contours of the ink images on the ink receiving layer to be vague and the color density of the ink images to be low, and, as a result, the resultant transmitted light images are not sharp and not clear. Also, when an ionic surfactant, especially a cationic surfactant, is contained in the ink receiving layer, agglomeration of the silica particles are promoted, and thus formation of uniform ink receiving layer is obstructed. Therefore, the sharpness and clarity of the ink images formed on the ink receiving layer may be degraded. Therefore, the ink receiving layer preferably contains substantially no surfactant.

The hydrated silica particles usable for the ink receiving layer of the present invention are preferably selected from those having a low agglomerating property to impart a uniform and microporous surface to the ink receiving layer and to prevent the dripping of the ink from the ink receiving layer. Generally, the silica particles are agglomerated with each other due to hydrogen bonds derived from silanol groups located on the surfaces of the silica particles. When the silica particles are agglomerated with each other to too large an extent, the surface structure of the ink receiving layer becomes dense, and the pores for receiving the ink therein decrease; and the dense surface of the ink receiving layer causes the ink applied to the surface to drip. The low agglomerative silica particles are typically anhydrous silica particles, and specifically modified silica particles in which the silanol groups are replaced by methylsiloxane groups. The anhydrous silica particles per se have a poor water-holding property and thus cannot fully prevent the dripping of the ink. Also, the methylsiloxane-modified silica particles exhibit a water-repellent property and thus cause the printing on the resultant ink receiving layer to be impossible.

In the case where the hydrated silica particles are employed for the ink receiving layer, an increase in the amount of the silanol groups located in the surface portion of the ink receiving layer causes the agglomerating property of the silica particles to be enhanced and thus the printing property of the resultant ink receiving layer to be greatly effected. Therefore, the water-holding property of the silica particles should not be decreased and the agglomerating property of the silica particles should be controlled to an appropriate level. In the present invention, the hydrated silica particles preferably have an average primary particle size of 20 to 35 nm, an average secondary particle size of 2 to 7 $\mu$m and a BET specific surface area of 50 to 170 $m^2/g$. This type of hydrated silica particles contributes to enhancing the ink absorption of the resultant ink receiving layer and the sharpness and clarity of the images formed on the ink receiving layer.

When the average primary particle size is less than 20 nm, the resultant silica particles have increased silanol groups and thus are agglomerated to too large an extent, a desired microporous surface of the ink receiving layer having a high ink absorption cannot be obtained and the ink-dripping phenomenon is increased. Also, when the average primary particle size is more than 35 nm, the water-holding property of the resultant ink receiving layer decreases and the ink-dripping phenomenon is promoted. When the average secondary particle size is less than 2 $\mu$m, the ink receiving layer surface becomes dense and thus the ink-dripping phenomenon is promoted. Also, when the average secondary particle size is more than 7 $\mu$m, the resultant ink receiving layer exhibits a significantly reduced wear resistance.

When the BET specific surface area is less than 50 $m^2/g$, the resultant silica particles have reduced pores in the particles and thus a reduced water-holding capacity and thus the ink-dripping phenomenon is promoted. Also, when the BET specific surface area is more than 170 $m^2/g$, the resultant ink receiving layer rapidly absorbs water from the ink by the capillary phenomenon due to the pores in the silica particles, and thus the ink is concentrated and fixed in the surface portion of the ink absorbing layer, and the resultant images observed through the transmitted light exhibit reduced sharpness and clarity.

Also, in the present invention, for the purpose of further degrading the agglomerating property of the silica particles and of enhancing the wetting property of the silica particles, the silica particles may be surface-treated with a surfactant. The surfactant usable for the above-mentioned purpose, is preferably selected from non-ionic surfactants which are free from ionic properties. When a cationic or anionic surfactant is used, the agglomeration of the silica particles may be promoted and the resultant coating liquid for forming the ink receiving layer may exhibit a reduced stability.

The water-holding material usable for the ink receiving layer of the present invention contributes to rapidly absorbing water from the aqueous ink images applied to the ink receiving layer and to promoting the drying of the aqueous ink images. However, when the ink receiving layer is formed from the water-holding material alone, the ink-dripping cannot be prevented. In the present invention, the pores formed between the specific hydrated silica particles serves to hold water so as to prevent the ink-dripping, and the water-holding material in the ink receiving layer serves to rapidly absorb the held water in the direction of the thickness of the ink receiving layer. The water-holding material usable for the present invention has a water-absorption ratio in weight of the water-holding material saturated with water to that free from water, of 5 to 50. The water-absorption ratio can be determined by dropping water at a dropping rate of 15 ml/min from a funnel toward the water-holding material in an amount of 1 g to such an extent that the water-holding material is saturated by water, and calculating a weight ratio of the water-saturated water-holding material to the water-free water-holding material. When the water-absorption ratio is less than 5, the resultant ink receiving layer cannot rapidly absorb water from the ink images formed thereon, and thus the ink-dripping occurs. When the water-absorption ratio is more than 50, the resultant ink receiving layer exhibits an unsatisfactory water resistance, and under a high humidity condition, the printed ink images are blotted and/or the ink receiving layer is peeled off from the sheet substrate.

The water-holding material usable for the present invention can be selected from various types of water-holding materials. The water-holding materials include starch compounds, for example, hydrolysis products of starch-acrylonitrile graft copolymers, and starch-acrylamide graft copolymers; cellulose compounds, for example, cellulose-styrenesulfonic acid graft copolymers and cross-linking products of carboxymethylcellulose; cross-linking products of polyvinyl alcohol; acrylic compounds, for example, cross-linking products of sodium polyacrylate and saponification products of polyacrylonitrile polymers; polyvinyl pyrrolidone polymers; copolymers and reaction products of polyalkyleneoxides with modifying compounds, and cross-linking products of the copolymers and reaction products, for example, random copolymers of polyethylenoxides with polypropyleneoxides and/or polylbutyleneoxides, and copolymers and reaction products of polyethyleneoxides, polypropyleneoxides and/or polyethyleneoxide-polypropyleneoxide random copolymers with hydrophobic organic compounds having at least one active hydrogen atom-containing group, for example, lauryl alcohol, cetyl alcohol and oleyl alcohol, or an organic compounds having two or more active hydrogen atom-containing groups, for example, ethylene glycol, butylamine, trimethylol propane and tris(hydroxy-ethyl)isocyanurate, and isocynanate-cross linking products of the copolymers and reaction products; maleic anhydride polymers; and cross-linked vinyl acetamide polymers.

In each of the water-holding materials, the water-absorption ratio thereof must be controlled to 5 to 50 by controlling the degree of cross-linking and the content of hydroxyl groups. The cross-linking products of polyalkyleneoxides and/or the cross-linking products of vinyl acetamide polymers are preferably employed for the present invention, because they are satisfactory in both the water-holding property and the water resistance. The addition polymerization products and cross-linking products of the polyalkyleneoxides are preferably selected from cross-linking products of polyalkyleneoxides, for example, polyethyleneoxides and polypropyleneoxides with isocyanate compounds. The cross-linking products of vinyl acetamide polymers are preferably selected from cross-linking products of N-vinyl acetamide addition polymerization products with isocyanate compounds.

In the advertisement sheet material of the present invention, the modified polyalkyleneoxide polymers usable as water-holding materials are preferably selected from the reaction products and copolymers shown below;

(a) reaction products of ethyleneoxide polymers with hydrophobic organic compounds having at least one active hydrogen atom-containing group, (b) polyhydroxyl compounds produced by a reaction of polyethyleneoxide polymers with hydrophilic organic compounds having two or more active hydrogen atom-containing groups, (c) reaction products of polyhydroxyl compounds with at least one member selected from dicarboxylic acids, dicarboxylic anhydride, lower alkylesters of the dicarboxylic acids and diisocyanate compounds, and (d) copolymers of ethyleneoxide and propyleneoxide, in which copolymers, the content of the copolymerized ethyleneoxide is 65 to 95% by weight and the weight average molecular weight of which copolymers is 200,000 or more.

In the above-mentioned reaction products (a), the hydrophobic organic compounds having at least one active hydrogen atom-containing group and to be reacted with the ethyleneoxide polymers include higher alcohols, for example, lauryl alcohol, cetyl alcohol and oleyl alcohol; natural alcohols, for example, coconut oil-reduced alcohol and tallow-reduced alcohol; synthetic alcohols including Ziegler alcohols, for example, ALFOL 1214, oxo alcohols, for example, DOBANOL 25 and OXOCOL 1215, and secondary alcohols, for example, TARDITOL S and SOFTERNOL; alkyl phenol compounds, for example, nonylphenol, dodecylphenol, octylphenol and octylcresol; fatty acids, for example, lauric acid, myristic acid, palmitic acid and oleic acid; higher aliphatic amines, for example, stearylamine; fatty acid amines, for example, oleic acid amide; and polypropyleneoxide-addtion polymerization products having a molecular weight of 1000 or more.

In the hydroxyl compounds (b), the hydrophilic organic compounds having two or more active hydrogen atom-containing groups and to be reacted with the ethyleneoxide include ethylene glycol, diethylene glycol, propylene glycol, dipropylene glycol, 1,4-butanediol, 1,6-hexanediol, bisphenol A, polyethylene glycol, polypropylene glycol, cycloaliphatic diols, for example, cyclohexane-1,4-dimethanol, and amines, for example, aniline, butylamine, octylamine, and cyclohexylamine. These compounds may be employed alone or in a mixture of two or more thereof.

The reaction products (c) are ones produced by a reaction of the above-mentioned hydroxyl compounds with at least one member selected from dicarboxylic acids, dicarboxylic anhydrides, lower alkyl esters (preferably $C_1$–$C_4$ alkyl esters) of the above-mentioned dicarboxylic acids and diisocyanate compounds. The above-mentioned dicarboxylic acids include, for example, phthalic acid, isophtahlic acid, terephthalic acid, malonic acid, succinic acid, sebacic acid, maleic acid, fumaric acid and adipic acid. The dicarboxylic anhydrides includes the anhydrides of the above-mentioned dicarboxylic acids. The lower alkyl esters of the dicarboxylic acids include methyl esters, dimethyl esters, ethyl esters and diethyl esters of the dicarboxylic acids. These compounds may be employed alone or in a mixture of two or more thereof. The diisocianate compounds include tolylene diisocyanate, diphenylmethane diisocyanate, hexamethylene diisocyanate, isophorone diisocyanate, and 4,4-methylene-bis(cyclohexylisocyanate).

Unless the solubility of the reaction products, mentioned above, in water is lost, mixtures of the polyhydroxyl compounds with modified polyols, for example, polybutadiene-polyols and hydroxyl group-containing vinyl polymers (acrylic polyols) may be reacted with at least one member selected from the above-mentioned dicarboxylic acids, dicarboxylic anhydrides, alkylesters of the dicarboxylic acids, and diisocyanate compounds. Alternatively, polymers of ethyleneoxide or copolymers ethylenoxide and copolymerizable compound therewith, for example, copolymers of polyethyleneoxide with methyl methacrylate, may be employed as a component of the water-holding material.

The modified polyalkyleneoxide resin usable for the present invention is preferably selected from ethylenoxide-propyleneoxide copolymers (d). In the ethyleneoxide-propyleneoxide copolymer (d), preferably, the content of the copolymerized ethyleneoxide segment is 65% by weight or more, more preferably 75 to 90% by weight, and the weight average molecular weight of the ethyleneoxidepropyleneoxide copolymers is 200,000 or more, more preferably 500,000 to 2,000,000. Also, where the copolymerized propyleneoxide segments contained in the copolymer (d) is in the form of blocks, the total weight average molecular weight of the polypropyleneoxide blocks is preferably 1,000 or more, more preferably 1,200 to 3,000. The above-mentioned type of ethyleneoxide-propyleneoxide copolymer (d) exhibits satisfactory water-absorption, water-holding property and water resistance.

When the content of the copolymerized ethyleneoxide segments contained in the copolymer (d) is less than 65% by weight or less, the resultant copolymer may exhibit an insufficient hydrophilicity, and thus the resultant ink receiving layer containing this type of copolymer may exhibit an insufficient ink absorption. Also, when the content of the copolymerized ethyleneoxide segments is more than 95% by weight, the resultant copolymer may exhibit an increased water solubility and thus the resultant ink receiving layer formed by using this type of copolymer may-exhibit an insufficient water resistance. Also, when the weight average molecular weight of the copolymer (d) is less than 200,000, the copolymer may exhibit a high water solubility and thus the resultant ink receiving layer obtained by using this type of copolymer may exhibit an insufficient water resistance. When the copolymer (d) has too high a weight average molecular weight (more than 2,000,000), the resultant coating liquid containing this type of copolymer may exhibit too high a viscosity and may exhibit a low processability (low process efficiency and high defect generation) in the formation of the ink receiving layer.

In the present invention, the acrylic resin binder usable for the ink receiving layer is preferably selected from those having a high mechanical strength, a small change in the mechanical strength due to absorption of moisture and a high wear resistance. The acrylic resin is preferably selected from (meth)acrylate esters and copolymers of (meth) acrylate esters with other comonomers. Particularly, the acrylic resins include (meth)acrylate esters, for example, methyl acrylate, methyl methacrylate, ethyl acrylate, ethyl methacrylate propyl acrylate, propyl methacrylate, butyl acrylate, butyl methacrylate, β-hydroxyacrylate, polyethyleneglycol acrylate, and glycidyl acrylate; and copolymers of at least one member selected from the (meth)acrylate esters with at least one other comonomer, for example, selected from acrylonitrile, styrene, vinyl acetate, butadiene, N-methylol acrylamide and maleic anhydride. More particularly, styrene-acrylate ester copolymers which have excellent water resistance, wear resistance and mechanical strength, are preferably employed. In this copolymer, preferably, the content of the copolymerized styrene in the copolymer is 5 to 20% by weight. When the copolymerized styrene content is less than 5% by weight, the resultant ink receiving layer may exhibit an insufficient water resistance. Also, when the styrene content is more than 20% by weight, the resultant ink receiving layer may have a reduced weathering resistance.

With respect to the weight composition of the hydrated silica, water-holding material, and the acrylic resin binder preferably, the content of the hydrated silica is 20 to 70% by weight, the content of the water-holding material is 10 to 30% by weight, and the content of the acrylic resin binder is 20 to 70% by weight. When the content of the hydrated silica is less than 20% by weight, clear transmitted light images may not be recorded on the resultant ink receiving layer, and when the content is more than 70% by weight, the resultant ink receiving layer may exhibit a significantly reduced wear resistance. When the water-holding material content is less than 10% by weight, the resultant ink receiving layer may exhibit an insufficient water-absorption and thus an ink-dripping may be caused, and when this content is more than 30% by weight, the resultant ink receiving layer may exhibit insufficient water resistance. When the content of the acrylic resin binder is less than 20% by weight, the resultant ink receiving layer may exhibit an insufficient wear resistance and when this content is more than 70% by weight, the resultant ink receiving layer may exhibit a reduced water absorption and a ink-dripping may occur on the ink receiving layer. The ink receiving layer optionally contain conventional additives, for example, ultraviolet ray absorbers and antioxidants, unless these additives affect on the ink absorption of the ink receiving layer.

In the advertisement sheet material of the present invention, the ink receiving layer optionally further contains phosphate ester flame retardants. In this case, the resultant ink received layer can exhibit an enhanced flame retarding property (flameproof property).

In the advertisement sheet material of the present invention, the phosphate ester flame retardants include, for example, alkyl phosphate esters, for example, trimethyl phosphate, triethyl phosphate, tripropyl phosphate, tributyl phosphate, tripentyl phosphate, trihexyl phosphate, dimethylethyl phosphate, and methyldibutyl phosphate, aromatic phosphate ester compounds, for example, triphenyl phosphate; tricresyl phosphate, diphenyloctyl phosphate, p-benzylphenyl phosphate, and hydroxyphenyldiphenyl phosphate, halogen-containing phosphate esters, for example, tris-chloroethyl phosphate, tris-dichloropropyl phosphate, tris(2,3-dibromopropyl)phosphate, tris(dibromophenyl)phosphate and tris(tribromoneopentyl phosphate); and condensation-polymerized oligomers of the above-mentioned compounds. Particularly, the aromatic phosphate ester-condensation polymerization products of the formula (I) and in the form of an oligomer:

(I)

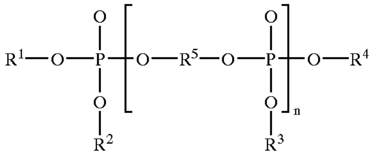

in which formula (I), n represents an integer of 1 to 10, $R^1$ to $R^4$ respectively and independently from each other represent a member selected from the group consisting of phenyl, tolyl, and xylyl groups, $R^5$ represents a polycyclic aromatic group, for example, phenylene derivative residue such as a residue of hydroquinone, resorcinol, diphenylolmethane or dihydroxydiphenyl, or phisphenol derivative residue, for example, a residue of bisphenol A and bisphenol S.

As particular oligomeric aromatic phosphate ester-condensation products of the formula (I), bisphenol A-bis (diphenylphosphate), bishpenol A-tetraphenyl diphosphate, bishpenol A-tetracresyl diphosphate, 1,3-phenylene-bis (diphenyl phosphate), resorcinol diphosphate and trioxybenzene-triphosphate are advantageously employed.

For the purpose of enhancing the flame retarding property, in addition to the above-mentioned flame retarders, a flame-retardant property-imparting agent other than the flame retarders may be added to the ink receiving layer unless the printing property of the ink receiving layer is degraded. The additional flame retardant property-imparting agent includes ammonium polyphosphate compounds, (iso)cyanuric acid derivative compounds, cyanamide compounds, urea compounds and inorganic fillers. The ammonium polyphosphate compounds include condensation products of ammonium orthophosphate with urea. The ammonium polyphosphate may be employed alone or after coating the ammonium polyphosphate particle surfaces with melamine, or after encapsulating the ammonium polyphosphate. The (iso) cyanuric acid derivative compounds include melamine, melamine sulfate, melamine phosphate, melamine polyphosphate, methylolmelamine, trimethyl cyanurate ester, triethyl cyanurate ester, ammelin, ammelid and 2,4,6-trioxy-cyanidin which are cyanuric acid derivatives, and isoammelin, isomelamine, isoammelid, trimethylcarbodiimide, triethylcarbodiimide and tricarboimide which are isocyanuric acid derivatives.

The cyanamide compounds include cyanamide derivatives, for example, dicyandiamide, dicyandiamidicine, guanidine, guanidine sulfamate, guanidine phosphate, and diguanide. The urea compounds include urea, dimethylol urea, diacetyl urea, trimethyl urea, N-benzoyl urea and guanylurea phosphate. The inorganic fillers include aluminum hydroxide, magnesium hydroxide, antimony trioxide and zinc borate.

In the advertisement sheet material of the present invention, the content of the phosphate ester flame-retarder contained in the ink receiving layer is preferably 2 to 30% by weight, more preferably 5 to 25% by weight, based on the total weight of the ink receiving layer. When the content of the phosphate ester flame retarder is less than 2% by weight, the resultant ink receiving layer may exhibit an insufficient flame-retardant property. Also, the content thereof is more than 30% by weight, the resultant ink receiving layer may exhibit an extremely reduced abrasion resistance.

In an embodiment of the advertisement sheet material of the present invention which is required to have a high flame retardant property, the sheet substrate (A) comprises at least one member selected from the group consisting of (1) base fiber fabric comprising at least one type of fibers selected from the group consisting of flame retardant synthetic fibers, flame retarder-containing synthetic fibers and flame-retardant-treated synthetic fibers and flame retardant-treated base fiber fabrics, and (2) base fiber fabrics coated with a flame retardant resinous coating layer comprising at least one member selected from the group consisting of flame retardant synthetic resins and flame retarder-containing synthetic resins; and the ink receiving layer further comprises, in addition to the hydrated silica particles, the water-holding material and the acrylic resin binder, a flame retarder comprising a phosphate ester compound.

In the advertisement sheet material of the present invention, the ink receiving layer (B) preferably contains a mildewproofing agent to enhance the mildewproofing property of the ink receiving layer. The mildewproofing agent preferably comprises at least one member of the compounds shown below.

Amide compounds, for example, 3,5-di-bromosalicyl-4-bromoanilide, N-(3,4-dichlorophenyl)-N'-(4-chlorophenyl) urea and 6-hydroxy-2-(3,5-dimethyl-1-pyrazolyl)-4-phenylpyridine;

Imidazole compounds, for example, 2-(4-thiazolyl-) benzimidazole, methyl-1-(butyl-carbomoyl)-2-(benzimidazole)carbamate, and methylbenzimidazole carbamate;

Benzotriazole compounds, for example, benzotriazole, 5-chlorobenzotriazole, and tolyltriazole;

Quaternary ammonium salts, for example, benzalconium chloride, ammonium dodecyltrimethylchloride, and ammonium didecyldimethylchloride;

Organic halogen compounds, for example, tetrachloroisophthalonitrile, 4-methylsulfonyltetrachloropyridine and 2,2-dibromo-2'-chloroacetophenone;

Organic metal compounds, for example, triphenyltin hydroxide and 10, 10'-oxybis-phenoxyarsine;

Thio compounds, for example, N,N'-dimethyl-N'-phenyl-N'-fluorodichloromethyl thiosulfamide, N-(fluorodichloromethylthio)phthalimide and bis (dimethyldithiocarbamoyl)disulfide;

Thiazole compounds, for example, 2-(thiocyanomethylthio)benzothiazole, sodium 2-methylcaptobenzothiazol and 1,2-benzoisothiazoline-3-one;

Silver-containing composites, for example, composites in which silver is carried on silica or zeolite. These mildewproofing agents can be selected in response to the type of the synthetic resins, the use circumstance and the use thereof.

Among the above-mentioned mildewproofing agents, the mildewproofing agents usable for the ink receiving layer (B) preferably comprise at least one member selected from the above-mentioned imidazole compounds, thiazole compounds and triazole compounds, or a composite material of at least one member of the above-specified compounds with at least one inorganic metal and/or at least one inorganic oxide.

In the advertisement sheet material of the present invention, the imidazole compounds to be added to the ink receiving layer to impart an mildewproofing property to the ink receiving layer, include, for example, 2-(4-thiazolyl) benzimidazole, 2-(methoxycarbonyl)-amino) benzimidazole, methyl-1-(butylcarbomoyl)-2-(benzimidazole)carbamate, methylbenzimidazole carbamate, bisphenyl-(2-chlorophenyl)-1-imidazolylmethane and 2-heptadecyl-2-imidazole. Also, the thiazole compounds include, for example, 2-(thiocyanomethylthio)benzothiazole, sodium 2-mercaptobenzothiazole, and 1,2-benzoisothiazoline-3-one. The triazole compounds preferably include benzotriazole, 5-chlorobenzotriazole and tolyltriazole.

The organic-inorganic compound composites produced by carrying or intercalating the mildewproofing compound alone or a composite of the mildewproofing compound with a metal compound on or into an inorganic oxide have an excellent mildewproofing property, and superior water resistance, weathering resistance and durability and thus are advantageously employed for the present invention. The metal compound usable for the organic-inorganic composites include silver compounds and copper compounds. Also, the inorganic oxides include, for example, porous compounds, for example, silica; laminar compounds, for example, zeolite; clay type minerals, for example, sepiolite; and phosphate salt compounds, for example, calcium phosphate, magnesium phosphate, and aluminum phosphate. Particularly, materials wherein a benzimidazol compound and silver are carried on silica (trademark: CS-100, made by SUMITOMO OSAKA CEMENT CO.), materials in which a phosphate salt compound or a laminar compound, for example, zeolite is intercalated with a thiazole compound or a triazole compound alone (trademark: CABINON 100, 80 or 900, made by TOA GOSEI K.K.), and methods in which a thiazole compound or a triazole compound is intercalated with silver (trademark: CABINON 200, made by TOAGOSEI K.K.) can be used as the organic-inorganic composites.

The content by weight of the mildewproofing agent contained in the ink receiving layer is preferably 0.2 to 10% by weight. When the content of the mildewproofing agent is less than 0.2% by weight, the resultant ink receiving layer may exhibit an insufficient mildewproofing property. Also, this content is more than 10% by weight, the resultant ink receiving layer may exhibit a significantly reduced wear resistance.

In the advertisement sheet material of the present invention, preferably a mildewproofing agent is contained in the resinous coating layer formed on the base fiber fabric of the sheet substrate (A). The mildewproofing agent for the resinous coating layer may be selected from the mildewproofing agents usable for the ink receiving layer (B) and other conventional mildewproofing agents.

Further, in the advertisement sheet material of the present invention, the base fiber fabric of the sheet substrate (A) preferably contains a mildewproofing agent, to enhance the mildewproofing property of the sheet material. The mildewproofing agent for the base fiber fabric may be selected from the mildewproofing agents usable for the ink receiving layer and other conventional mildewproofing agents. Preferably, at least one member selected from the above-mentioned imidazole compounds, thiazole compounds and triazole compounds is preferably used for the base fiber fabric. However, the mildewproofing agent for the base fiber fabric is not limited to those mentioned above. For example, preferably, the base fiber fabric is pre-treated with a solution of a mildewproofing agent, for example, pentachlorophenol or 2,2'-methylene-bis-4-chlorophenol, or a solution comprising the above-mentioned mildewproofing agent and a resin binder.

The ink receiving layer formed on the sheet substrate preferably has a thickness of 3 to 50 $\mu$m. When the thickness is less than 3 $\mu$m, the resultant ink receiving layer may exhibit an insufficient ink absorption and thus an ink-dripping may occur. Also, when the thickness is more than 50 $\mu$m, the resultant ink receiving layer may exhibit an insufficient wear resistance.

Furthermore, for the purpose of enhancing the water resistance and durability of the printed images, a protective layer is optionally formed on the ink receiving layer after the ink images are printed thereon. The protective layer comprises a resin which must be transparent. The transparent resin for the protective layer is preferably selected from polyvinyl chloride resins, polyurethane resins, ethylene-vinyl acetate copolymer resins, ethylene-(meth)acrylate ester copolymer resins, acrylic resins, polyester resins, fluorine resins and silicone resins. There is no limitation to the method of forming the protective layer. The protective layer may be formed by an atomizing method (spray method), a coating method, a dripping method, and a film-laminating method. The protective layer may contain at least one additive selected from ultraviolet ray-absorbing agents and mildewproofing agents, unless the additive causes the resultant protective layer to exhibit a degraded transparency.

EXAMPLES

The present invention will be further explained by the following examples.

In the examples, the following tests were applied to the products to evaluate the properties thereof.

(1) Wear Resistance

A specimen was subjected to the same abrasion test as in Japanese Industrial Standard (JIS) L 1096, the GAKUSHIN ABRASION TEST METHOD, except that the abrasive paper sheet was replaced by a cotton fabric, under a pressing load of 200 gf. The abrasion was repeated 100 times.

The test result was evaluated by the naked eye observation in the following four classes.

| Class | Wear resistance |
|---|---|
| 4 | Very good |
| 3 | Good |
| 2 | Slightly bad |
| 1 | Bad |

(2) Printability

On a front surface of a specimen, ink jet images were recorded by using an automatic printing apparatus (Model: PRP-22, made by PENTEL K.K., and the ink absorption of the specimen and clarity of the printed images were evaluated by the naked eye observation.

The images were observed by the light emitted from a light source arranged on the back side of the specimen and transmitted through the specimen at an illuminance of the front surface of the specimen of 1200 lux.

The test result was evaluated in the following 4 classes.

| Class | Clarity of images |
|---|---|
| 4 | Very good |
| 3 | Good |
| 2 | Slightly bad |
| 1 | Bad |

(2) Water Resistance of Images

The printed specimen produced in the same manner as in the printability test (3) was immersed in hot water at a temperature of 40° C. for 3 days. The change in clarity of the image due to the water immersion was observed by the naked eye observation and the water resistance of the images was evaluated in the following 4 classes.

| Class | Water resistance |
|---|---|
| 4 | Very good |
| 3 | Good |
| 2 | Slightly bad |
| 1 | Bad |

(4) Flame-proofness

A specimen was subjected to a flame-proofness test (microburner method) for sheet materials, in accordance with Japanese Industrial Standard L 1091, A-1 method (the Fire Service Rule (Japan), Article 4 ter, paragraphs 3, 4 and 7), by a one minute heating method. The flame-proofness test was applied to the specimen before and after applying the water resistance test to the specimen. In the test, the after flame time, the after glow time and the carbonized area of the specimen were measured.

In the test result, when the after flame, was 3 seconds or less, the after glow time was 5 seconds or less and the carbonized area was 30 $cm^2$ or less, the specimen passed the test. The water resistance test was carried out by immersing the specimen in water at a temperature of 40° C. for 3 days, and by evaluating the flame-proofness of the specimen before and after the water immersion.

(4) Mildewproofness Test

A specimen was subjected to a mildewproofness test in accordance with JIS Z 2311. containing no propagated in an ink receiving layer was cultivated in a mildewproofing agent of the specimen was cultivated in s laboratory disk to form fungus bodies, and it was evaluated whether a halo effect is found by the naked eye. The mildewproofness test was applied to the specimen before and after a water resistance test in which the specimen was immersed in water at a temperature of 40° C. for 3 days was applied thereto, and a change in test result of the specimen before and after the water immersion was evaluated, in the following five classes.

| Class | Mildewproofness |
|---|---|
| 1 | No mold propagation on the specimen surface was found. |
| 2 | Very slight propagation of mold was found on the specimen surface. |
| 3 | Mold propagation was found on ⅓ or less of the specimen surface area. |
| 4 | Mold propagation was found on more than ⅓ but not more than ⅔ of the specimen surface area. |
| 5 | Mold propagation was found on all the specimen surface area. |

Example 1

A base fiber fabric consisting of a polyester filament mesh woven fabric having the weave structure:

250 denier×250 denier/20 yarns/25.4 mm×20 yarns/25.4 mm was used. The front and back surfaces of the base fiber fabric were laminated each with a white soft polyvinyl chloride resin film having a thickness of 0.2 mm, to provide a sheet substrate. The sheet substrate had a tensile strength of 48 kg/3 cm in both the warp and weft directions and a light transmission of 25%. To enhance the adhesion between the sheet substrate and an ink receiving layer, an acrylic adhesive (trademark: SC-474, made by SONY CHEMICAL K.K.) was coated on the front surface of the sheet substrate and dried to form a primer layer in amount of 3 $g/m^2$ on the sheet substrate.

Separately, a coating liquid composition for the ink receiving layer was prepared in the following composition.

Composition for Ink Receiving Layer

| Component | Part by weight |
|---|---|
| Styrene-acryl copolymer resin emulsion (solid content: 40% by weight, copolymerized styrene content: 8% by weight) | 100 |
| Cross-linked polyethyleneoxide polymer (trademark: AQUACOK, made by SUMITOMO SEIKA K.K.) | 20 |
| Hydrated silica pigment (trademark: E-150J, made by NIPPON SILICA KOGYO K.K.) | 40 |

In the coating liquid composition, the solid contents of the styrene-acryl copolymer, the cross-linked polyethyleneoxide polymer and the hydrated silica pigment were respectively 40% by weight, 20% by weight and 40% by weight. The cross-linked polyethyleneoxide polymer exhibited a water-absorption ratio was 25. The hydrated silica pigment had an average primary particle size of 32 nm, an average secondary particle size of 4.0 μm, and a BET specific surface area of 90 $m^2/g$.

The coating liquid composition for the ink receiving layer was diluted with a mixed solvent consisting of water and isopropyl alcohol (in a mixing ratio of 1:1 by weight) in an amount of 3 times the weight of the coating liquid composition to provide a coating liquid for the ink receiving layer.

The coating liquid for the ink receiving layer was coated in a thickness of 100 μm on the primer layer by using an air knife coater and dried at a temperature of 120° C. to form an ink receiving layer having a thickness of 30 μm. A sheet material for advertisement was obtained.

The composition of the advertisement sheet material and test results are shown in Tables 1 and 2, respectively.

Example 2

An advertisement sheet material was produced and tested by the same procedures as in Example 1, with the following exceptions.

The hydrated silica particles of Example 1 were replaced-by particles surface treated with a nonionic surfactant and having an average primary particle size of 30 nm, an average secondary particle size of 3.2 μm and a BET specific surface area of 110 $m^2/g$ and available under the trademark of HYDRATED SILICA E-170 from NIPPON SILICA KOGYO K.K.

The composition and test results of the sheet material are shown in Tables 1 and 2, respectively.

Example 3

An advertisement sheet material was produced and tested by the same procedures as in Example 1, with the following exceptions.

The hydrated silica particles of Example 1 were replaced by particles having an average primary particle size of 24 nm, an average secondary particle size of 2.5 μm and a BET specific surface area of 140 $m^2/g$ and available under the trademark of HYDRATED SILICA (E-200, from NIPPON SILICA KOGYO K.K.

The composition and test results of the sheet material are shown in Tables 1 and 2, respectively.

Example 4

An advertisement sheet material was produced and tested by the same procedures as in Example 1, with the following exceptions.

The cross-linked polyethyleneoxide polymer having the water absorption ratio of 25 of Example 1 was replaced by a cross-linked polyethyleneoxide polymer having a water absorption ratio of 40.

The composition and test results of the sheet material are shown in Tables 1 and 2, respectively.

Example 5

An advertisement sheet material was produced and tested by the same procedures as in Example 1, with the following exceptions.

The cross-linked polyethyleneoxide polymer of Example 1 was replaced by a cross-linked N-vinyl acetamide polymer having a water absorption ratio of 10.

The composition and test results of the sheet material are shown in Tables 1 and 2, respectively.

Example 6

An advertisement sheet material was produced and tested by the same procedures as in Example 1, with the following exceptions.

The coating liquid composition of the ink receiving layer contained 100 parts by weight of the styrene-acryl copolymer, 20 parts by weight of the cross-linked polyethyleneoxide polymer and 70 parts by weight of the hydrated silica pigment. In the coating liquid composition, the solid contents of the styrene-acryl copolymer, the cross-linked polyethyleneoxide and the hydrated silica pigment were respectively 31% by weight, 15% by weight and 54% by weight.

The composition and test results of the sheet material are shown in Tables 1 and 2, respectively.

Example 7

An advertisement sheet material was produced and tested by the same procedures as in Example 1, with the following exceptions.

In the coating liquid composition of the ink receiving layer, the cross-linked polyethyleneoxide polymer was replaced by a cross-linked N-vinyl acetamide polymer having a water absorption ratio of 30, the hydrated silica (E-150J) was replaced by the same hydrated silica (E-170) as that used in Example 2. Also, the coating liquid composition contained the styrene-acryl copolymer, the cross-linked N-vinyl acetamide polymer and the hydrated silica pigment respectively in amounts of 100 parts by weight, 24 parts by weight and 25 parts by weight and in solid contents of 45% by weight, 27% by weight and 28% by weight.

The composition and test results of the sheet material are shown in Tables 1 and 2, respectively.

Comparative Example 1

An advertisement sheet material was produced and tested by the same procedures as in Example 1, with the following exceptions.

In the coating liquid composition of the ink receiving layer, the hydrated silica pigment (E-150J) of Example 1 was replaced by a hydrated silica (trademark: HYDRATED SILICA NA, made by NIPPON SILICA KOGYO K.K.) having an average secondary particle size of 9.0 μm and a BET specific surface area of 115 $m^2/g$.

The composition and test results of the sheet material are shown in Tables 1 and 2, respectively.

Comparative Example 2

An advertisement sheet material was produced and tested by the same procedures as in Example 1, with the following exceptions.

In the coating liquid composition of the ink receiving layer, the hydrated silica pigment (E-150J) of Example 1 was replaced by a hydrated silica (trademark: HYDRATED SILICA E1011, made by NIPPON SILICA KOGYO K.K.) having an average primary particle size of 24 nm, an average secondary particle size of 1.5 μm and a BET specific surface area of 140 $m^2/g$.

The composition and test results of the sheet material are shown in Tables 1 and 2, respectively.

Comparative Example 3

An advertisement sheet material was produced and tested by the same procedures as in Example 1, with the following exceptions.

In the coating liquid composition of the ink receiving layer, the hydrated silica pigment (E-150J) of Example 1 was replaced by a hydrated silica (trademark: HYDRATED SILICA E74P, made by NIPPON SILICA KOGYO K.K.) having an average primary particle size of 80 nm, an average secondary particle size of 2.8 μm and a BET specific surface area of 48 $m^2/g$.

The composition and test results of the sheet material are shown in Tables 1 and 2, respectively.

Comparative Example 4

An advertisement sheet material was produced and tested by the same procedures as in Example 1, with the following exceptions.

In the coating liquid composition of the ink receiving layer, the hydrated silica pigment (E-150J) of Example 1 was replaced by a hydrated silica (trademark: HYDRATED SILICA L300, made by NIPPON SILICA KOGYO K.K.) having an average secondary particle size of 4.0 μm and a BET specific surface area of 195 $m^2/g$.

The composition and test results of the sheet material are shown in Tables 1 and 2, respectively.

Comparative Example 5

An advertisement sheet material was produced and tested by the same procedures as in Example 1, with the following exceptions.

In the coating liquid composition of the ink receiving layer, the hydrated silica pigment (E-150J) of Example 1 was replaced by a hydrophobic silica (trademark: HYDROPHOBIC SILICA SS70, made by NIPPON SILICA KOGYO K.K.) having an average particle size of 4.2 μm and a BET specific surface area of 55 $m^2/g$.

The composition and test results of the sheet material are shown in Tables 1 and 2, respectively.

Comparative Example 6

An advertisement sheet material was produced and tested by the same procedures as in Example 1, with the following exceptions.

In the coating liquid composition of the ink receiving layer, the hydrated silica pigment (E-150J) of Example 1 was replaced by an anhydrous silica (trademark: AEROSIL 130, made by NIPPON AEROSIL K.K.) having an average primary particle size of 16 nm and a BET specific surface area of 130 $m^2/g$.

The composition and test results of the sheet material are shown in Tables 1 and 2, respectively.

Comparative Example 7

An advertisement sheet material was produced and tested by the same procedures as in Example 1, with the following exceptions.

In the coating liquid composition of the ink receiving layer, the cross-linked polyethyleneoxide polymer of Example 1 was replaced by a vinyl alcohol-acrylic acid copolymers (trademark: SUMIKA GEL S520, made by SUMITOMO KAGAKUKOGYO K.K.) having a water absorption ratio of 600.

The composition and test results of the sheet material are shown in Tables 1 and 2, respectively.

Comparative Example 8

An advertisement sheet material was produced and tested by the same procedures as in Example 1, with the following exceptions.

In the coating liquid composition for the ink receiving layer, the styrene-acryl copolymer, the cross-linked polyethyleneoxide polymer and the hydrated silica pigments were respectively in amounts of 100 parts by weight, 40 parts by weight, and 320 parts by weight and in solid contents of 10% by weight, 10% by weight and 80% by weight.

The composition and test results of the sheet material are shown in Tables 1 and 2, respectively.

Comparative Example 9

An advertisement sheet material was produced and tested by the same procedures as in Example 1, with the following exceptions.

In the coating liquid composition of the ink receiving layer, the styrene-acryl copolymer, the cross-linked polyethyleneoxide polymer and the hydrated silica pigments were respectively in amounts of 100 parts by weight, 32 parts by weight, and 8 parts by weight and in solid contents of 50% by weight, 40% by weight and 10% by weight.

The composition and test results of the sheet material are shown in Tables 1 and 2, respectively.

Comparative Example 10

An advertisement sheet material was produced and tested by the same procedures as in Example 1, with the following exceptions.

In the coating liquid composition of the ink receiving layer, the styrene-acryl copolymer of Example 1 was replaced by an ethylene-vinyl acetate copolymer (trademark: V-100, made by MITSUI KAGAKU K.K.) having a solid content of 40% by weight.

The composition and test results of the sheet material are shown in Tables 1 and 2, respectively.

TABLE 1

| | Item | | | | | | | | | |
|---|---|---|---|---|---|---|---|---|---|---|
| | Silica | | | | | Water-holding material | | | Resin binder | |
| Example No. | Type | Amount (wt %) | Average primary particle size (nm) | Average Secondary particle size ($\mu m$) | BET specific surface area ($m^2/g$) | Type | Amount (wt %) | Water absorption ratio | Type | Amount (wt %) |
| Example | | | | | | | | | | |
| 1 | *1 | 40 | 32 | 4.0 | 90 | *A | 20 | 25 | *a | 40 |
| 2 | *1 | 40 | 30 | 3.2 | 110 | *A | 20 | 25 | *a | 40 |
| 3 | *1 | 40 | 24 | 2.5 | 140 | *A | 20 | 25 | *a | 40 |
| 4 | *1 | 40 | 32 | 4.0 | 90 | *A | 20 | 40 | *a | 40 |
| 5 | *1 | 40 | 32 | 4.0 | 90 | *B | 20 | 10 | *a | 40 |
| 6 | *1 | 54 | 32 | 4.0 | 90 | *A | 15 | 25 | *a | 31 |
| 7 | *1 | 28 | 30 | 3.2 | 110 | *B | 27 | 30 | *a | 45 |
| Comparative Example | | | | | | | | | | |
| 1 | *1 | 40 | — | 9.0 | 115 | *A | 20 | 25 | *a | 40 |
| 2 | *1 | 40 | 24 | 1.5 | 140 | *A | 20 | 25 | *a | 40 |
| 3 | *1 | 40 | 80 | 2.0 | 48 | *A | 20 | 25 | *a | 40 |
| 4 | *1 | 40 | — | 4.0 | 195 | *A | 20 | 25 | *a | 40 |
| 5 | *2 | 40 | — | 4.2 | 55 | *A | 20 | 25 | *a | 40 |
| 6 | *3 | 40 | 16 | — | 130 | *A | 20 | 25 | *a | 40 |
| 7 | *1 | 40 | 32 | 4.0 | 90 | *C | 20 | 600 | *a | 40 |
| 8 | *1 | 80 | 32 | 4.0 | 90 | *A | 10 | 25 | *a | 10 |
| 9 | *1 | 10 | 32 | 4.0 | 90 | *A | 40 | 25 | *a | 50 |
| 10 | *1 | 40 | 32 | 4.0 | 90 | *A | 20 | 25 | *b | 40 |

TABLE 1-continued

| | Item | | | | | | | | | |
|---|---|---|---|---|---|---|---|---|---|---|
| | Silica | | | | | Water-holding material | | | Resin binder | |
| Example No. | Type | Amount (wt %) | Average primary particle size (nm) | Average Secondary particle size (μm) | BET specific surface area ($m^2/g$) | Type | Amount (wt %) | Water absorption ratio | Type | Amount (wt %) |

Note of Table 1
*1: Hydrated silica particles
*2: Hydrophobic silica particles
*3: Anhydrous silica particles
*A: Cross-linked polyethyleneoxide polymer
*B: Cross-linked N-vinyl acetamide polymer
*C: Vinyl alcohol-acrylicacid copolymer
*a: Styrene-acryl copolymer
*b: Ethylene-vinyl acetate copolymer

TABLE 2

| | Item | | | | |
|---|---|---|---|---|---|
| | | Clarity of printed images | | | |
| Example No. | Ink absorption | Reflected light images | Transmitted light images | Images after water-resistant test | Appearance after abrasion test |
| Example | | | | | |
| 1 | 4 | 3 | 4 | 4 | 4 |
| 2 | 4 | 3 | 3 | 4 | 4 |
| 3 | 4 | 3 | 3 | 4 | 4 |
| 4 | 4 | 3 | 3 | 3 | 4 |
| 5 | 4 | 3 | 3 | 4 | 4 |
| 6 | 4 | 3 | 4 | 4 | 3 |
| 7 | 3 | 4 | 3 | 4 | 4 |
| Comparative Example | | | | | |
| 1 | 1 | 2 | 2 | 4 | 4 |
| 2 | 2 | 3 | 1 | 4 | 4 |
| 3 | 2 | 2 | 1 | 4 | 4 |
| 4 | 2 | 3 | 1 | 4 | 4 |
| 5 | 1 | 1 | 1 | 4 | 4 |
| 6 | 2 | 2 | 1 | 4 | 4 |
| 7 | 3 | 3 | 2 | 1 | 2 |
| 8 | 4 | 1 | 4 | 3 | 1 |
| 9 | 3 | 3 | 1 | 1 | 4 |
| 10 | 4 | 3 | 4 | 1 | 2 |

Tables 1 and 2 clearly show that when the advertisement sheet materials of the present invention provided with the ink receiving layers each containing hydrated silica particles having average primary particle size of 15 to 35 nm, an average secondary particle size of 2 to 7 μm and a BET specific surface area of 50 to 170 $m^2/g$; a water-holding material having a water absorption ratio of 5 to 50, and an acrylic resin binder, are subjected to an ink jet printing, transmitted light images having a high clarity, an excellent water resistance and a superior wear resistance could be recorded on the sheet materials without dripping the ink.

Example 8

A base fiber fabric consisting of a polyester filament mesh woven fabric having the weave structure:

$$\frac{250\ \text{denier} \times 250\ \text{denier}}{20\ \text{yarns}/25.4\ \text{mm} \times 20\ \text{yarns}/25.4\ \text{mm}}$$

was used. The front and back surfaces of the base fiber fabric were laminated each with a white soft polyvinyl chloride resin film having a thickness of 0.2 mm, to provide a sheet substrate. The sheet substrate had a tensile strength of 48 kg/3 cm in both the warp and weft directions and a light transmission of 25%. To enhance the adhesion between the sheet substrate and an ink receiving layer, an acrylic adhesive (trademark: SC-474, made by SONY CHEMICAL K.K.) was coated on the front surface of the sheet substrate and dried to form a primer layer in an amount of 3 $g/m^2$ on the sheet substrate.

Separately, a coating liquid composition for the ink receiving layer was prepared in the following composition.

Composition for Ink Receiving Layer

| Component | Part by weight |
|---|---|
| Acrylate ester polymer emulsion (trademark: AM-200, made by SHOWA KOBUNSHI K.K.) having a solid content of 40% by weight | 100 |
| Ethyleneoxide/propyleneoxide copolymer | 27 |
| Hydrated silica pigment (trademark: E-150J, made by NIPPON SILICA KOGYO K.K.) | 67 |

In the coating liquid composition, the solid contents of the acrylate ester polymer, the ethyleneoxide/propyleneoxide copolymer and the hydrated silica pigment were respectively 30% by weight, 20% by weight and 50% by weight. The ethyleneoxide/propyleneoxide copolymer had a content of copolymerized ethyleneoxide of 87% by weight, a weight average molecular weight of 900,000 and a water-absorption ratio of 20. The hydrated silica pigment had an average primary particle size of 32 nm, an average secondary particle size of 4.0 μm, and a BET specific surface area of 90 $m^2/g$.

The coating liquid composition for the ink receiving layer was diluted with a mixed solvent consisting of water and isopropyl alcohol in a mixing ratio of 1:1 by weight) in an amount of 3 times the weight of the coating liquid composition to provide a coating liquid for the ink receiving layer.

The coating liquid for the ink receiving layer was coated in a thickness of 100 μm on the primer layer by using an air knife coater and dried at a temperature of 120° C. to form an ink receiving layer having a thickness of 30 μm. A sheet material for advertisement was obtained.

The composition and test results of the sheet material are shown in Tables 3 and 4, respectively.

Example 9

An advertisement sheet material was produced and tested by the same procedures as in Example 8, with the following exceptions.

The hydrated silica particles of Example 8 were replaced by particles surface treated with a nonionic surfactant and having an average primary particle size of 30 nm, an average secondary particle size of 3.2 μm and a BET specific surface area of 110 $m^2/g$ and available under the trademark of HYDRATED SILICA E-170 from NIPPON SILICA KOGYO K.K.

The composition and test results of the sheet material are shown in Tables 3 and 4, respectively.

Example 10

An advertisement sheet material was produced and tested by the same procedures as in Example 8, with the following exceptions.

In the coating liquid composition of the ink receiving layer, the hydrated silica particles (E-150J) of Example 8 were replaced by hydrated silica particles (trademark: HYDRATED SILICA E-200A, made by NIPPON SILICA KOGYO K.K.) having an average primary particle size of 24 nm, an average secondary particle size of 2.5 μm and a BET specific surface area of 140 $m^2/g$.

The composition and test results of the sheet material are shown in Tables 3 and 4, respectively.

Comparative Example 11

An advertisement sheet material was produced and tested by the same procedures as in Example 8, with the following exceptions.

In the coating liquid composition for the ink receiving layer, the ethyleneoxide/propyleneoxide copolymer of Example 8 was replaced by a polymer comprising, as a principal component, copolymerized ethyleneoxide; prepared by using, as a starting substance, ethylene glycol by addition polymerizing ethyleneoxide and propyleneoxide at random, and by reacting the resultant polyhydroxyl compound with dimethyl terephthalate; and having a content of the copolymerized ethyleneoxide of 80% by weight and a weight average molecular weight of 250,000. This copolymer exhibited a water absorption ratio of 30.

The composition and test results of the sheet material are shown in Tables 3 and 4, respectively.

Example 12

An advertisement sheet material was produced and tested by the same procedures as in Example 8, with the following exceptions.

In the coating liquid composition of the ink receiving layer, the ethyleneoxide/propyleneoxide copolymer was replaced by an other ethyleneoxide/propyleneoxide copolymer having a copolymerized ethyleneoxide content of 70% by weight and a weight average molecular weight of 500,000 and exhibiting a water absorption ratio of 10.

The composition and test results of the sheet material are shown in Tables 3 and 4, respectively.

Example 13

An advertisement sheet material was produced and tested by the same procedures as in Example 8, with the following exceptions.

In the coating liquid composition of the ink receiving layer, the ethyleneoxide/propyleneoxide copolymer was replaced by an other ethyleneoxide/propyleneoxide copolymer having a copolymerized ethyleneoxide content of 80% by weight and a weight average molecular weight of 700,000 and exhibiting a water absorption ratio of 15.

The composition and test results of the sheet material are shown in Tables 3 and 4, respectively.

Example 14

An advertisement sheet material was produced and tested by the same procedures as in Example 8, with the following exceptions. In the coating liquid composition of the ink receiving layer, the hydrated silica pigment (E-150J) was replaced by the hydrated silica pigment (E-170) used in Example 9, and the acrylate ester polymer emulsion, the ethyleneoxide/propyleneoxide copolymers and the hydrated silica pigment were contained respectively in amounts of 100 parts by weight, 15 parts by weight and 85 parts by weight and in solid contents of 28% by weight, 11% by weight and 61% by weight.

The composition and test results of the sheet material are shown in Tables 3 and 4, respectively.

Comparative Example 11

An advertisement sheet material was produced and tested by the same procedures as in Example 8, with the following exceptions.

In the coating liquid composition of the ink receiving layer, the hydrated silica pigment (E-150J) of Example 1 was replaced by the hydrated silica (trademark: HYDRATED SILICA NA, made by NIPPON SILICA KOGYO K.K.) having an average secondary particle size of 9.0 μm and a BET specific surface area of 115 $m^2/g$.

The composition and test results of the sheet material are shown in Tables 3 and 4, respectively.

Comparative Example 12

An advertisement sheet material was produced and tested by the same procedures as in Example 8, with the following exceptions.

In the coating liquid composition of the ink receiving layer, the hydrated silica pigment (E-150J) of Example 1 was replaced by the hydrated silica (trademark: HYDRATED SILICA E1011, made by NIPPON SILICA KOGYO K.K.) having an average primary particle size of 24 nm, an average secondary particle size of 1.5 μm and a BET specific surface area of 140 $m^2/g$.

The composition and test results of the sheet material are shown in Tables 3 and 4, respectively.

Comparative Example 13

An advertisement sheet material was produced and tested by the same procedures as in Example 8, with the following exceptions.

In the coating liquid composition of the ink receiving layer, the hydrated silica pigment (E-150J) of Example 1 was replaced by a hydrated silica (trademark: HYDRATED SILICA E74P, made by NIPPON SILICA KOGYO K.K.) having an average primary particle size of 80 nm, an average secondary particle size of 2.8 μm and a BET specific surface area of 48 $m^2/g$.

The composition and test results of the sheet material are shown in Tables 3 and 4, respectively.

Comparative Example 14

An advertisement sheet material was produced and tested by the same procedures as in Example 8, with the following exceptions.

In the coating liquid composition of the ink receiving layer, the hydrated silica pigment (E-150J) of Example 1 was replaced by a hydrated silica (trademark: HYDRATED SILICA L300, made by NIPPON SILICA KOGYO K.K.) having an average secondary particle size of 4.0 μm and a BET specific surface area of 195 $m^2/g$.

The composition and test results of the sheet material are shown in Tables 3 and 4, respectively.

Comparative Example 15

An advertisement sheet material was produced and tested by the same procedures as in Example 8, with the following exceptions.

In the coating liquid composition of the ink receiving layer, the hydrated silica pigment (E-150J) of Example 1 was replaced by a hydrophobic silica (trademark: HYDROPHOBIC SILICA SS70, made by NIPPON SILICA KOGYO K.K.) having an average particle size of 4.2 μm and a BET specific surface area of 55 $m^2/g$.

The composition and test results of the sheet material are shown in Tables 3 and 4, respectively.

Comparative Example 16

An advertisement sheet material was produced and tested by the same procedures as in Example 8, with the following exceptions. In the coating liquid composition for the ink receiving layer, the ethyleneoxide/propyleneoxide copolymer of Example 8 was replaced by a water-soluble polyethylenoxide having a weight average molecular weight of 1,000,000.

The composition and test results of the sheet material are shown in Tables 3 and 4, respectively.

Example 17

An advertisement sheet material was produced and tested by the same procedures as in Example 8, with the following exceptions.

In the coating liquid composition for the ink receiving layer, the ethyleneoxide/propyleneoxide copolymer was replaced by an other ethyleneoxide/propyleneoxide copolymer having a copolymerized ethyleneoxide content of 50% by weight and a weight average molecular weight of 150,000 and exhibiting a water absorption ratio of 2.

The composition and test results of the sheet material are shown in Tables 3 and 4, respectively.

Comparative Example 18

An advertisement sheet material was produced and tested by the same procedures as in Example 1, with the following exceptions. In the coating liquid composition for the ink receiving layer, the acrylate ester polymer emulsion of Example 8 replaced by a modified synthetic rubber emulsion (trademark: PA-4, made by SHOWA KOBUNSHI K.K.) having a solid content of 48% by weight, and the hydrated silica pigment, the water-holding material and the acrylic resin binder were respectively contained in amounts of 34% by weight, 19% by weight and 47% by weight.

The composition and test results of the sheet material are shown in Tables 3 and 4, respectively.

TABLE 3

| | Item | | | | | | | | | | | |
|---|---|---|---|---|---|---|---|---|---|---|---|---|
| | Silica | | | | | Water-holding material | | | | | Resin binder | |
| Example No. | Type | Amount (wt %) | Average primary particle size (nm) | Average secondary particle size (μm) | BET specific surface area | Type | Amount (wt %) | Ethylene oxide content (%) | Weight average molecular weight | Water absorption ratio | Type | Amount (wt %) |
| Example | | | | | | | | | | | | |
| 8 | *1 | 50 | 32 | 4.0 | 90 | *D | 20 | 87 | 900,000 | 20 | *c | 30 |
| 9 | *1 | 50 | 30 | 3.2 | 110 | *D | 20 | 87 | 900,000 | 20 | *c | 30 |
| 10 | *1 | 50 | 24 | 2.5 | 140 | *D | 20 | 87 | 900,000 | 20 | *c | 30 |
| 11 | *1 | 50 | 32 | 4.0 | 90 | *E | 20 | 80 | 250,000 | 30 | *c | 30 |
| 12 | *1 | 50 | 32 | 4.0 | 90 | *D | 20 | 70 | 500,000 | 10 | *c | 30 |
| 13 | *1 | 50 | 32 | 4.0 | 90 | *D | 20 | 80 | 700,000 | 15 | *c | 30 |
| 14 | *1 | 50 | 30 | 3.2 | 110 | *D | 11 | 87 | 900,000 | 20 | *c | 28 |
| Comparative Example | | | | | | | | | | | | |
| 11 | *1 | 61 | — | 9.0 | 115 | *D | 20 | 87 | 900,000 | 20 | *c | 30 |
| 12 | *1 | 50 | 24 | 1.5 | 140 | *D | 20 | 87 | 900,000 | 20 | *c | 30 |
| 13 | *1 | 50 | 80 | 2.8 | 48 | *D | 20 | 87 | 900,000 | 20 | *c | 30 |

TABLE 3-continued

| | Item | | | | | | | | | | | |
|---|---|---|---|---|---|---|---|---|---|---|---|---|
| | Silica | | | | | Water-holding material | | | | | Resin binder | |
| Example No. | Type | Amount (wt %) | Average primary particle size (nm) | Average secondary particle size (μm) | BET specific surface area | Type | Amount (wt %) | Ethylene oxide content (%) | Weight average molecular weight | Water absorption ratio | Type | Amount (wt %) |
| 14 | *1 | 50 | — | 4.0 | 195 | *D | 20 | 87 | 900,000 | 20 | *c | 30 |
| 15 | *2 | 50 | — | 4.2 | 55 | *D | 20 | 87 | 900,000 | 20 | *c | 30 |
| 16 | *1 | 50 | 32 | 4.0 | 90 | *F | 20 | 100 | 1,000,000 | — | *c | 30 |
| 17 | *1 | 50 | 32 | 4.0 | 90 | *D | 20 | 50 | 150,000 | 2 | *c | 30 |
| 18 | *1 | 47 | 32 | 4.0 | 90 | *D | 19 | 87 | 900,000 | 20 | *d | 34 |

*1: Hydrated silica pigment
*2: Hydrophobic silica pigment
*D: Ethyleneoxide/propyleneoxide copolymer
*E: Ethyleneoxide/propyleneoxide/dimethyl terephthalate terpolymer
*F: Ethyleneoxide polymer
*c: Acrylate ester polymer
*d: Modified synthetic rubber

TABLE 4

| | Item | | | | |
|---|---|---|---|---|---|
| | | Clarity of printed images | | | |
| Example No. | Ink absorption | Reflected light images | Transmitted light images | Images after water-resistance test | Appearance after abrasion test |
| Example | | | | | |
| 8 | 4 | 3 | 4 | 4 | 4 |
| 9 | 4 | 3 | 3 | 4 | 4 |
| 10 | 4 | 3 | 3 | 4 | 4 |
| 11 | 4 | 3 | 4 | 3 | 3 |
| 12 | 3 | 3 | 4 | 4 | 4 |
| 13 | 4 | 3 | 4 | 4 | 4 |
| 14 | 4 | 3 | 4 | 4 | 3 |
| Comparative Example | | | | | |
| 11 | 1 | 2 | 2 | 4 | 4 |
| 12 | 2 | 3 | 1 | 4 | 4 |
| 13 | 2 | 2 | 1 | 4 | 4 |
| 14 | 2 | 3 | 1 | 4 | 4 |
| 15 | 1 | 1 | 1 | 4 | 4 |
| 16 | 4 | 3 | 4 | 1 | 2 |
| 17 | 1 | 2 | 2 | 1 | 1 |
| 18 | 3 | 3 | 3 | 1 | 1 |

Tables 3 and 4 clearly show that when the advertisement sheet materials of the present invention provided with the ink receiving layers each containing hydrated silica particles having average primary particle size of 15 to 35 nm, an average secondary particle size of 2 to 7 μm and a BET specific surface area of 50 to 170 $m^2/g$; a water-holding material consisting of a modified alkyleneoxide polymer and having a water absorption ratio of 5 to 50, particularly an ethyleneoxide/propyleneoxide copolymer having a copolymerized ethyleneoxide content of 65 to 95% by weight and a weight average molecular weight of 200,000 or more, and an acrylic resin binder, are subjected to an ink jet printing, transmitted light images having a high clarity, an excellent water resistance and a superior wear resistance could be recorded on the sheet materials without dripping the ink.

Example 15

A base fiber fabric consisting of a polyester filament mesh woven fabric having the weave structure:

$$\frac{250 \text{ denier} \times 250 \text{ denier}}{20 \text{ yarns}/25.4 \text{ mm} \times 20 \text{ yarns}/25.4 \text{ mm}}$$

was used. The front and back surfaces of the base fiber fabric were laminated each with a white soft polyvinyl chloride resin film having a thickness of 0.2 mm, to provide a sheet substrate.

The polyvinyl chloride film had the following composition.

Film Composition

| Component | Part by weight |
|---|---|
| Polyvinyl chloride resin | 100 |
| Plasticizer (dioctyl phthalate) | 40 |
| Liquid flame retarder (tricresyl phosphate) | 20 |
| Inorganic flame retardar (antimony trioxide) | 8 |
| Ba—Zn stabilizer | 2 |
| Titanium dioxide | 4 |

In the flameproofing performance of the resultant sheet substrate, the after flame time was 0 second, the after glow time was 0 second, and the carbonized area was 12 $cm^2$. Thus, the sheet substrate passed the flameproofness test.

The sheet substrate had a tensile strength of 48 kg/3 cm in both the warp and weft directions and a light transmission of 25%. To enhance the adhesion between the sheet substrate and an ink receiving layer, an acrylic adhesive (trademark: SC-474, made by SONY CHEMICAL K.K.) was coated on the front surface of the sheet substrate and dried to form a primer layer in an amount of 3 $g/m^2$ on the sheet substrate.

Separately, a coating liquid composition for the ink receiving layer was prepared in the following composition.

Composition for Ink Receiving Layer

| Component | Part by weight |
|---|---|
| Acrylate ester polymer emulsion (trademark: AM-200, made by SHOWA KOBUNSHI K.K.) having a solid content of 40% | 100 |
| Bisphenol A-bis (diphenylphosphate) (Condensation product of aromatic phosphate ester) | 20 |
| Ethyleneoxide/propyleneoxide copolymer | 28 |
| Hydrated silica pigment (trademark: E-150J, made by NIPPON SILICA KOGYO K.K.) | 67 |

In the coating liquid composition, the solid contents of the acrylate ester polymer emulsion, the aromatic phosphate ester-condensation product, the ethyleneoxide/propyleneoxide copolymer and the hydrated silica pigment were respectively 26% by weight, 13% by weight, 17.5% by weight and 43.5% by weight. The ethyleneoxide/propyleneoxide copolymer had a content of copolymerized ethyleneoxide of 87% by weight and a weight average molecular weight of 900,000, and exhibited a water-absorption ratio of 20. The hydrated silica pigment had an average primary particle size of 32 nm, an average secondary particle size of 4.0 $\mu$m, and a BET specific surface area of 90 $m^2/g$.

The coating liquid composition for the ink receiving layer was diluted with a mixed solvent consisting of water and isopropyl alcohol in a mixing ratio of 1:1 by weight) in an amount of 3 times the weight of the coating liquid composition to provide a coating liquid for the ink receiving layer.

The coating liquid for the ink receiving layer was coated in a thickness of 100 $\mu$m on the primer layer by using an air knife coater and dried at a temperature of 120° C. to form an ink receiving layer having a thickness of 30 $\mu$m. A sheet material for advertisement was obtained.

The composition of the advertisement sheet material and test results thereof are shown in Tables 5 and 6, respectively.

Example 16

An advertisement sheet material was produced and tested by the same procedures as in Example 15, with the following exceptions. In the coating liquid composition for the ink receiving layer, as a phosphate ester flame retarder, resorcinol-bis(diphenyl phosphate) was employed.

The composition and test results of the sheet material are shown in Tables 5 and 6, respectively.

Example 17

An advertisement sheet material was produced and tested by the same procedures as in Example 15, with the following exceptions. In the coating liquid composition for the ink receiving layer, as a phosphate ester flame retarder, bisphenol A-tetracresyl diphosphate was employed.

The composition and test results of the sheet material are shown in Tables 5 and 6, respectively.

Example 18

An advertisement sheet material was produced and tested by the same procedures as in Example 15, with the following exceptions. In the coating liquid composition for the ink receiving layer, as an additional flame retarder, 5 parts by weight of methylolmelamine were added. In this coating liquid composition, the solid contents of the acrylate ester polymer emulsion, the aromatic phosphate ester-condensation product, the methylemelamine, the ethyleneoxide/propyleneoxide copolymer and the hydrated silica pigment were respectively 25% by weight, 12.5% by weight, 3% by weight, 17% by weight and 42.5% by weight.

The composition and test results of the sheet material are shown in Tables 5 and 6, respectively.

Example 19

An advertisement sheet material was produced and tested by the same procedures as in Example 15, with the following exceptions. In the coating liquid composition for the ink receiving layer, the ethyleneoxide/propyleneoxide copolymer of Example 15 was replaced by a cross-linked polyethyleneoxide (trademark: AQUACOK, made by SUMITOMO SEIKA K.K.), as a water-holding material. This water-holding material exhibited a water absorption ratio of 25.

The composition and test results of the sheet material are shown in Tables 5 and 6, respectively.

Example 20

An advertisement sheet material was produced and tested by the same procedures as in Example 15, with the following exceptions. In the coating liquid composition for the ink receiving layer, the ethyleneoxide/propyleneoxide copolymer of Example 15 was replaced by a cross-linked N-vinyl acetamide polymer having a water absorption ratio of 10.

The composition and test results of the sheet material are shown in Tables 5 and 6, respectively.

Example 21

An advertisement sheet material was produced and tested by the same procedures as in Example 15, with the following exceptions.

The sheet substrate of Example 15 was replaced by another sheet substrate consisting of a flame retardant-treated high density cotton woven fabric (PROVAN-processed, by ALBRIGHT AND WILSON CO.) having the following weave structure:

$$\frac{120^S \times 120^S}{78\ \text{yarns}/25.4\ \text{mm} \times 55\ \text{yarns}/25.4\ \text{mm}}$$

The sheet substrate had a after flame time and after glow time of 0 second and a carbonized area of 15 $cm^2$ and passed the flameproof test.

The adhesive layer of Example 15 was omitted, and the same ink receiving layer as in Example 15 was formed on the sheet substrate, to provide an advertisement sheet material.

The composition and test results of the sheet material are shown in Tables 5 and 6, respectively.

Example 22

An advertisement sheet material was produced and tested by the same procedures as in Example 15, with the following exceptions.

The sheet substrate of Example 15 was replaced by another sheet substrate consisting of a high density polyester woven fabric having the following weave structure:

$$\frac{50\ \text{denier} \times 50\ \text{denier}}{65\ \text{yarns}/25.4\ \text{mm} \times 58\ \text{yarns}/25.4\ \text{mm}}$$

The sheet substrate had a after flame time and after glow time of 10 seconds or more and a carbonized area or 60 $cm^2$ or more and did not pass the flameproof test.

The adhesive layer of Example 15 was omitted, and an ink receiving layer was formed on the sheet substrate, by the same procedure as in Example 15, except that the bisphenol A-bis(diphenyl phosphate) was used in an amount of 35 parts by weight, and the solid contents of the acrylate ester polymer emulsion, the aromatic phosphate ester-condensation product, the ethyleneoxide-propyleneoxide copolymer and the hydrated silica pigment in the coating liquid composition were respectively 23.5% by weight, 20.5% by weight, 16.5% by weight, and 39.5% by weight. An advertisement sheet material was obtained.

The composition and test results of the sheet material are shown in Tables 5 and 6, respectively.

TABLE 5

| | Item | | | | | | | | | | | | | | | | | |
|---|---|---|---|---|---|---|---|---|---|---|---|---|---|---|---|---|---|---|
| | Sheet substrate | | | | Hydrated silica | | | | | Water-holding material | | | Resin binder | | Flame retarder | | | |
| | Base fiber fabric | | Resinous coating layer | | | | | | | | | | | | Main | | Additional | |
| Example No. | Type of fiber | Flame-retardant treatment | Type of resin | Flame retarder | Type | Amount (wt %) | Average primary particle size (nm) | Average secondary particle size (μm) | BET specific area ($m^2/g$) | Type | Amount (wt %) | Water absorption ratio | Type | Amount (wt %) | Type | Amount (wt %) | Type | |
| Example | | | | | | | | | | | | | | | | | | |
| 15 | PES | None | PVC | Contained | *1 | 43.5 | 32 | 4.0 | 90 | *D | 17.5 | 20 | *c | 26 | ① | 13 | — | |
| 16 | PES | None | PVC | Contained | *1 | 43.5 | 32 | 4.0 | 90 | *D | 17.5 | 20 | *c | 26 | ② | 13 | — | — |
| 17 | PES | None | PVC | Contained | *1 | 43.5 | 32 | 4.0 | 90 | *D | 17.5 | 20 | *c | 26 | ③ | 13 | — | — |
| 18 | PES | None | PVC | Contained | *1 | 23.5 | 32 | 4.0 | 90 | *D | 17.0 | 20 | *c | 25 | ① | 12.5 | ④ | — |
| 19 | PES | None | PVC | Contained | *1 | 43.5 | 32 | 4.0 | 90 | *D | 17.5 | 20 | *c | 26 | ① | 13 | — | — |
| 20 | PES | None | PVC | Contained | *1 | 43.5 | 32 | 4.0 | 90 | *B | 17.5 | 10 | *c | 26 | ① | 13 | — | — |
| 21 | Cotton | Applied | — | — | *1 | 43.5 | 32 | 4.0 | 90 | *D | 17.5 | 20 | *c | 26 | ① | 13 | — | — |
| 22 | PES | None | — | — | *1 | 39.5 | 32 | 4.0 | 90 | *D | 16.5 | 20 | *c | 23.5 | ① | 20.5 | — | — |

Note for Table 5
PES: Polyester fibers
PVC: Polyvinyl chloride resin
*I: Hydrated silica pigment
*B: Cross-linked N-vinyl acetamide polymer
*D: Ethyleneoxide/propyleneoxide copolymer
*G: Cross-linked polyethyleneoxide polymer
*c: Acrylate ester polymer
①: Bisphenol A-bis(diphenyl phosphate)
②: Resorcinol-bis(diphenyl phosphate)
③: Bisphenol A-tetracresyl diphosphate
④: Methylolmelamine

TABLE 6

| | Item | | | | | | | | | | | | | |
|---|---|---|---|---|---|---|---|---|---|---|---|---|---|---|
| | | Clarity of printed images | | | | Flameproofing performance | | | | | | | | |
| | | | | | | Before water resistance test | | | | After water resistance test | | | | |
| Example No. | Ink absorption | Reflected light images | Transmitted light images | Images after water resistance test | Appearance after abrasion test | After flame time (s) | After glow time (s) | Carbonized area ($cm^2$) | General evaluation | After flame time (s) | After glow time (s) | Carbonized area ($cm^2$) | General evaluation |
| Example | | | | | | | | | | | | | |
| 15 | 4 | 3 | 4 | 4 | 4 | 0 | 0 | 13.5 | Passed | 1.2 | 1.2 | 16.5 | Passed |
| 16 | 4 | 3 | 4 | 4 | 4 | 0 | 0 | 14.0 | Passed | 1.0 | 1.5 | 18.0 | Passed |
| 17 | 4 | 3 | 4 | 4 | 4 | 0 | 0 | 12.0 | Passed | 1.5 | 1.5 | 20.0 | Passed |
| 18 | 3 | 4 | 3 | 3 | 3 | 0 | 0 | 18.5 | Passed | 1.2 | 1.2 | 18.5 | Passed |
| 19 | 4 | 3 | 4 | 4 | 4 | 0 | 0 | 15.5 | Passed | 2.0 | 2.0 | 25.0 | Passed |
| 20 | 4 | 3 | 4 | 4 | 4 | 0 | 0 | 13.0 | Passed | 1.0 | 1.0 | 14.5 | Passed |
| 21 | 4 | 3 | 4 | 4 | 4 | 0 | 0 | 17.0 | Passed | 2.0 | 2.2 | 26.5 | Passed |
| 22 | 4 | 3 | 4 | 4 | 4 | 0 | 0 | 23.5 | Passed | 1.5 | 1.5 | 27.5 | Passed |

Example 23

An advertisement sheet material was produced and tested by the same procedures as in Example 16, with the following exceptions. In the coating liquid composition for the ink receiving layer, the resorcinol-bis(diphenyl phosphate) was employed in an amount of 30 parts by weight, and the solid contents of the acrylate ester polymer emulsion, the aromatic phosphate ester-condensation product, the ethyleneoxide/propyleneoxide copolymer and the hydrated silica pigment were respectively 24% by weight, 18% by weight, 17% by weight, and 41% by weight.

The composition and test results of the sheet material are shown in Tables 7 and 8, respectively.

Example 24

An advertisement sheet material was produced and tested by the same procedures as in Example 17, with the following exceptions. In the coating liquid composition for the ink receiving layer, the ethyleneoxide/propyleneoxide copolymer was replaced by a cross-linked N-vinyl acetamide polymer having a water absorption ratio of 10, the bisphenol A-tetracresyl diphosphate was employed in an amount of 10 parts by weight, and the solid contents of the acrylate ester polymer emulsion, the aromatic phosphate ester-condensation product and the cross-linked N-vinyl acetamide polymer and the hydrated silica pigment were respectively 28% by weight, 7% by weight, 19% by weight and 46% by weight.

The composition and test results of the sheet material are shown in Tables 7 and 8, respectively.

Example 25

An advertisement sheet material was produced and tested by the same procedures as in Example 15, with the following exceptions. In the coating liquid composition for the ink receiving layer, the hydrated silica particles of Example 17 were replaced by other hydrated silica particles (trademark: E-200A, made by NIPPON SILICA KOGYO K.K.) having an average primary particle size of 24 nm, an average primary particle size of 24 $\mu$m, an average secondary particle size of 2.5 $\mu$m and a BET specific surface area of 140 $m^2$/g.

The composition and test results of the sheet material are shown in Tables 7 and 8, respectively.

Example 26

An advertisement sheet material was produced and tested by the same procedures as in Example 21, with the following exceptions. In the coating liquid composition for the ink receiving layer, the hydrated silica pigment of Example was replaced by another hydrated silica pigment (trademark: E-170, made by NIPPON SILICA KOGYO K.K.) prepared by surface treating the hydrated silica particles with a nonionic surfactant and having an average primary particle size of 30 nm, an average secondary particle size of 3.2 $\mu$m and a BET specific surface area of 110 $m^2$/g.

The composition and test results of the sheet material are shown in Tables 7 and 8, respectively.

Example 27

An advertisement sheet material was produced and tested by the same procedures as in Example 15, with the following exceptions.

In the sheet substrate, the base fiber fabric of Example 15 was replaced by a flame retardant polyester filament woven fabric (of which the polyester filament yarns were produced by TOYO BOSEKI K.K.) having the following high density weave structure:

$$\frac{50\ \text{denier} \times 50\ \text{denier}}{65\ \text{yarns}/25.4\ \text{mm} \times 58\ \text{yarns}/25.4\ \text{mm}}$$

The sheet substrate had an after flame time of 0 second, an after glow time of 0 second and a carbonized area of 10 $cm^2$ and thus passed the flameproofness test. The sheet substrate was directly coated with an ink receiving layer by the same procedures as in Example 15, except that no adhesive layer was formed on the sheet substrate.

The composition and test results of the sheet material are shown in Tables 7 and 8, respectively.

Example 28

An advertisement sheet material was produced and tested by the same procedures as in Example 15, with the following exceptions.

In the sheet substrate, the base fiber fabric of Example 15 was replaced by an aramid filament woven fabric (of which the aramid filament: NOMEX (trademark), made by DU PONT) having the following high density weave structure:

$$\frac{20^D/_1 \times 20^D/_1}{55\ \text{yarns}/25.4\ \text{mm} \times 55\ \text{yarns}/25.4\ \text{mm}}$$

The sheet substrate had an after flame time of 0 second, an after glow time of 0 second and a carbonized area of 6 $cm^2$ and thus passed the flameproofness test. The sheet substrate was directly coated with an ink receiving layer by the same procedures as in Example 15, except that no adhesive layer was formed on the sheet substrate.

The composition and test results of the sheet material are shown in Tables 7 and 8, respectively.

Example 29

An advertisement sheet material was produced and tested by the same procedures as in Example 15, with the following exceptions.

In the sheet substrate, the base fiber fabric of Example 15 was replaced by a flame retardant NOVOLOID filament woven fabric (of which the ester NOVOLOID filament yarns (trademark: KYNOL) were produced by NIPPON KYNOL K.K.) having the following high density structure:

$$\frac{20^D/_2 \times 20^D/_2}{49\ \text{yarns}/25.4\ \text{mm} \times 47\ \text{yarns}/25.4\ \text{mm}}$$

The sheet substrate had an after flame time of 0 second, an after glow time of 0 second and a carbonized area of 5 $cm^2$ and thus passed the flameproofness test. The sheet substrate was directly coated with an ink receiving layer by the same procedures as in Example 15, except that no adhesive layer was formed on the sheet substrate.

The composition and test results of the sheet material are shown in Tables 7 and 8, respectively.

TABLE 7

| Example No. | Sheet substrate: Base fiber fabric: Type of fiber | Base fiber fabric: Flame-proof treatment | Resinous coating layer: Type of resin | Resinous coating layer: Flame retarder | Hydrated silica: Type | Hydrated silica: Amount (wt %) | Hydrated silica: Average primary particle size (nm) | Hydrated silica: Average secondary particle size ($\mu m$) | Hydrated silica: BET specific area ($m^2/g$) | Water-holding material: Type | Water-holding material: Amount (wt %) | Water-holding material: Water absorption ratio | Resin binder: Type | Resin binder: Amount (wt %) | Flame retarder: Main: Type | Flame retarder: Main: Amount (wt %) | Flame retarder: Additional: Type | Flame retarder: Additional |
|---|---|---|---|---|---|---|---|---|---|---|---|---|---|---|---|---|---|---|
| Example | | | | | | | | | | | | | | | | | | |
| 23 | PES | None | PVC | Contained | *1 | 41 | 32 | 4.0 | 90 | *D | 17 | 20 | *c | 24 | ② | 18 | — | — |
| 24 | PES | None | PVC | Contained | *1 | 46 | 32 | 4.0 | 90 | *B | 19 | 10 | *c | 28 | ③ | 7 | — | — |
| 25 | PES | None | PVC | Contained | *1 | 43.5 | 24 | 2.5 | 140 | *D | 17.5 | 20 | *c | 26 | ① | 13 | — | — |
| 26 | Cotton | Applied | — | — | *1 | 43.5 | 30 | 3.2 | 110 | *D | 17.5 | 20 | *c | 26 | ① | 13 | — | — |
| 27 | PES | Applied | — | — | *1 | 43.5 | 32 | 4.0 | 90 | *D | 17.5 | 20 | *c | 26 | ① | 13 | — | — |
| 28 | Aramid | Applied | — | — | *1 | 43.5 | 32 | 4.0 | 90 | *D | 17.5 | 20 | *c | 26 | ① | 13 | — | — |
| 29 | NOVOLOID | Applied | — | — | *1 | 43.5 | 32 | 4.0 | 90 | *D | 17.5 | 20 | *c | 26 | ① | 13 | — | — |

Note for Table 7
PES: Polyester fibers
Aramid: Nomex (trademark), DU PONT
NOVOLOID: KAINOL, NIPPON KAINOL K.K.
PVC: Polyvinyl chloride resin
*1: Hydrated silica pigment
*B: Cross-linked N-vinyl acetamide polymer
*D: Ethyleneoxide/propyleneoxide copolymer
*c: Acrylate ester polymer
①: Bisphenol A-bis(diphenyl phosphate)
②: Resorcinol-bis(diphenyl phosphate)
③: Bisphenol A-tetracresyldiphenyl phospate

TABLE 8

| Example No. | Ink absorption | Clarity of printed images: Reflected light images | Clarity of printed images: Transmitted light images | Images after water resistance test | Appearance after abrasion test | Flameproofing performance, Before water resistance test: After flame time (s) | Before: After glow time (s) | Before: Carbonized area ($cm^2$) | Before: General evaluation | After water resistance test: After flame time (s) | After: After glow time (s) | After: Carbonized area ($cm^2$) | After: General evaluation |
|---|---|---|---|---|---|---|---|---|---|---|---|---|---|
| Example | | | | | | | | | | | | | |
| 23 | 3 | 4 | 3 | 4 | 3 | 0 | 0 | 10.0 | Passed | 0.3 | 0.3 | 12.5 | Passed |
| 24 | 4 | 3 | 4 | 4 | 4 | 0 | 0 | 17.5 | Passed | 1.9 | 1.9 | 21.3 | Passed |
| 25 | 4 | 3 | 4 | 4 | 4 | 0 | 0 | 16.3 | Passed | 1.3 | 1.3 | 18.2 | Passed |
| 26 | 3 | 3 | 4 | 4 | 4 | 0 | 0 | 16.5 | Passed | 2.0 | 2.0 | 26.0 | Passed |
| 27 | 4 | 3 | 4 | 4 | 4 | 0 | 0 | 12.5 | Passed | 0.9 | 0.9 | 13.8 | Passed |
| 28 | 4 | 3 | 4 | 4 | 4 | 0 | 0 | 8.9 | Passed | 0.7 | 0.7 | 11.0 | Passed |
| 29 | 4 | 3 | 4 | 4 | 4 | 0 | 0 | 8.2 | Passed | 0.7 | 0.7 | 10.7 | Passed |

Tables 5 to 8 clearly show that the advertisement sheet materials of Examples 15 to 29 in accordance with the present invention and having the ink receiving layer which comprises a hydrated silica particles having an average primary particle size of 15 to 35 nm, an average secondary particle size of 2 to 7 μm, and a BET specific surface area of 50 to 170 $m^2/g$, a water-holding material having a water absorption ratio of 5 to 50, an acrylic resin polymer binder, and a flame retarder comprising a phosphate ester compound, can record ink images having high clarity, water resistance and wear resistance without dripping the ink, and exhibit a high flameproofing property.

Example 30

A base fiber fabric consisting of a polyester filament mesh woven fabric having the weave structure:

$$\frac{250\ \text{denier} \times 250\ \text{denier}}{20\ \text{yarns}/25.4\ \text{mm} \times 20\ \text{yarns}/25.4\ \text{mm}}$$

was used. The front and back surfaces of the base fiber fabric were laminated each with a white soft polyvinyl chloride resin film having a thickness of 0.2 mm and the following composition.

Composition of Film

| Component | Part by weight |
|---|---|
| Polyvinyl chloride resin | 100 |
| Plasticizer (dioctyl phthalate) | 40 |
| Ba—Zn stabilizer | 2 |
| Titanium dioxide pigment | 4 |
| Mildewproofing agent (tetrachloro-isophthalonitrile) | 0.2 |

The resultant sheet substrate exhibited a mildewproofing property of class 2, and had a tensile strength of 48 kg/3 cm in each of the warp and weft directions, and a light transmission of 25%. To enhance the adhesion between the sheet substrate and an ink receiving layer, an acrylic adhesive (trademark: SC-474, made by SONY CHEMICAL K.K.) was coated on the front surface of the sheet substrate and dried to form a primer layer in an amount of 3 $g/m^2$ on the sheet substrate.

Separately, a coating liquid composition for the ink receiving layer was prepared in the following composition.

Composition for Ink Receiving Layer

| Component | Part by weight |
|---|---|
| Acrylate ester polymer emulsion having a solid content of 40% (trademark: AM-200, made by SHOWA KOBUNSHI K.K.) | 100 |
| Imidazol mildewproofing agent (2-(4-thiazolyl)benzimidazole) | 2 |
| Ethyleneoxide/propyleneoxide copolymer | 28 |
| Hydrated silica pigment (trademark: E-150J, made by NIPPON SILICA KOGYO K.K.) | 67 |

In the resultant composition, the solid contents of the acrylate ester polymer emulsion, the mildewproofing agent, the ethyleneoxide/propyleneoxide copolymer and the hydrated silica pigment were respectively 29.2% by weight, 1.5% by weight, 20.4% by weight and 48.9% by weight.

Also, in the ethyleneoxide/propyleneoxide copolymer, the content of the copolymerized ethyleneoxide was 87% by weight, the weight average molecular weight was 900,000, and the water absorption ratio was 20.

The hydrated silica pigment had an average primary particle size of 32 nm, an average secondary particle size of 4.0 μm, and a BET specific surface area of 90 $m^2/g$.

The coating liquid composition of the ink receiving layer was diluted with a mixed solvent consisting of water and isopropyl alcohol in a mixing ratio of 1:1 by weight) in an amount of 3 times the weight of the coating liquid composition to provide a coating liquid for the ink receiving layer.

The coating liquid for the ink receiving layer was coated in a thickness of 100 μm on the primer layer by using an air knife coater and dried at a temperature of 120° C. to form an ink receiving layer having a thickness of 30 μm. A sheet material for advertisement was obtained.

The composition of the advertisement sheet material and the test results thereof are shown in Tables 9 and 10, respectively.

Example 32

An advertisement sheet material was produced and tested by the same procedures as in Example 30, with the following exceptions. In the coating liquid composition for the ink receiving layer, the mildewproofing agent of Example 30 was replaced by a triazole mildewproofing agent comprising 5-chlorobenzotriazole.

The composition and test results of the sheet material are shown in Tables 9 and 10, respectively.

Example 33

An advertisement sheet material was produced and tested by the same procedures as in Example 30, with the following exceptions. In the coating liquid composition for the ink receiving layer, the mildewproofing agent of Example 30 was replaced by a trizole mildewproofing agent (trademark: KABINON 100, made by TOA GOSEI K.K.) in an amount of 5% by weight, and the solid contents of the acrylate ester polymer emulsion, the mildewproofing agent, the ethyleneoxide/propyleneoxide copolymer, and the hydrated silica pigment were respectively 28.6% by weight, 3.6% by weight, 19.3% by weight, and 48.5% by weight.

The composition and test results of the sheet material are shown in Tables 9 and 10, respectively.

Example 34

An advertisement sheet material was produced and tested by the same procedures as in Example 30, with the following exceptions. In the coating liquid composition for the ink receiving layer, the mildewproofing agent of Example 30 was replaced by a trizole/silver composite mildewproofing agent (trademark: KABINON 200, made by TOA GOSEI K.K.) in an amount of 5% by weight, and the solid contents of the acrylate ester polymer emulsion, the mildewproofing agent, the ethyleneoxide/propyleneoxide copolymer, and the hydrated silica pigment were respectively 28.6% by weight, 3.6% by weight, 19.3% by weight, and 48.5% by weight.

The composition and test results of the sheet material are shown in Tables 9 and 10, respectively.

Example 35

An advertisement sheet material was produced and tested by the same procedures as in Example 30, with the following exceptions. In the coating liquid composition for the ink receiving layer, the mildewproofing agent of Example 30 was replaced by 5 parts by weight of an imidazole/silver composite mildewproofing agent (trademark: CS-100, made by SUMITOMO OSAKA CEMENT K.K.).

The composition and test results of the sheet material are shown in Tables 9 and 10, respectively.

Example 36

An advertisement sheet material was produced and tested by the same procedures as in Example 30, with the following exceptions. In the coating liquid composition for the ink receiving layer, the ethyleneoxide/propyleneoxide copolymer copolymer of Example 30 was replaced by a cross-linked polyethyleneoxide polymer (trademark: AQUACOK, made by SUMITOMO SEIKA K.K.) having a water absorption ratio of 25.

The composition and test results of the sheet material are shown in Tables 9 and 10, respectively.

Example 37

An advertisement sheet material was produced and tested by the same procedures as in Example 30, with the following exceptions. In the coating liquid composition for the ink receiving layer, the ethyleneoxide/propyleneoxide copolymer copolymer of Example 30 was replaced by a cross-linked N-vinyl acetamide polymer having a water absorption ratio of 10.

The composition and test results of the sheet material are shown in Tables 9 and 10, respectively.

Example 38

An advertisement sheet material was produced and tested by the same procedures as in Example 30, with the following exceptions.

The soft polyvinyl chloride films for the sheet substrate contained no mildewproofing agent.

The sheet substrate had a mildewproofness of class 5 (worst).

The composition and test results of the sheet material are shown in Tables 9 and 10, respectively.

Example 39

An advertisement sheet material was produced and tested by the same procedures as in Example 30, with the following exceptions.

A polyester filament high density woven fabric having the following weave structure was used as a sheet substrate.

$$\frac{50^D \times 50^D}{65 \text{ yarns}/25.4 \text{ mm} \times 58 \text{ yarns}/25.4 \text{ mm}}$$

The sheet substrate had a mildewproofness of class 5 (worst).

The sheet substrate was directly coated with the same ink receiving layer as in Example 1, without coating an adhesive layer, to provide an advertisement sheet material. In the coating liquid composition for the ink receiving layer, the solid contents of the acrylate ester polymer emulsion, the mildewproofing agent, the ethyleneoxide/propyleneoxide copolymer and the hydrated silica pigment were respectively 27.6% by weight, 6.9% by weight, 18.6% by weight and 46.9% by weight.

The composition and test results of the sheet material are shown in Tables 9 and 10, respectively.

Example 40

An advertisement sheet material was produced and tested by the same procedures as in Example 1, with the following exceptions.

A high density cotton woven fabric having the weave structure shown below was used as a sheet substrate.

$$\frac{120^S \times 120^S}{78 \text{ yarns}/25.4 \text{ mm} \times 55 \text{ yarns}/25.4 \text{ mm}}$$

The sheet substrate exhibited a mildewproofness of class 5 (worst).

On the sheet substrate, the same ink receiving layer as in Example 39 was formed to provide an advertisement sheet material.

The composition and test results of the sheet material are shown in Tables 9 and 10, respectively.

TABLE 9

| | Item | | | | | | | | | | | | | | | |
|---|---|---|---|---|---|---|---|---|---|---|---|---|---|---|---|---|
| | Sheet substrate | | | Hydrated silica | | | | | | | | | | | | |
| | Base fiber | Resinous coating layer | | | | | | | Water-holding material | | | | Resin binder | | Mildew-proofing agent | |
| Example No. | fabric Type of fiber | Type of resin | Mildew-proofing agent | Type | Amount (wt %) | Average primary particle size (nm) | Average secondary particle size (µm) | BET specific area ($m^2$/g) | Type | Amount (wt %) | Water absorption ratio | | Type | Amount (wt %) | Type | Amount (wt %) |
| Example | | | | | | | | | | | | | | | | |
| 30 | PES | PVC | Contained | *1 | 48.9 | 32 | 4.0 | 90 | *D | 20.4 | 20 | | *c | 29.2 | Ⓐ | 1.5 |
| 31 | PES | PVC | Contained | *1 | 48.9 | 32 | 4.0 | 90 | *D | 20.4 | 20 | | *c | 29.2 | Ⓑ | 1.5 |
| 32 | PES | PVC | Contained | *1 | 48.9 | 32 | 4.0 | 90 | *D | 20.4 | 20 | | *c | 29.2 | Ⓒ | 1.5 |
| 33 | PES | PVC | Contained | *1 | 48.5 | 32 | 4.0 | 90 | *D | 19.3 | 20 | | *c | 28.6 | Ⓓ | 3.6 |
| 34 | PES | PVC | Contained | *1 | 48.5 | 32 | 4.0 | 90 | *D | 19.3 | 20 | | *c | 28.6 | Ⓓ | 3.6 |
| 35 | PES | PVC | Contained | *1 | 48.5 | 32 | 4.0 | 90 | *D | 19.3 | 20 | | *c | 28.6 | Ⓔ | 3.6 |
| 36 | PES | PVC | Contained | *1 | 48.9 | 32 | 4.0 | 90 | *A | 20.4 | 25 | | *c | 29.2 | Ⓐ | 1.5 |
| 37 | PES | PVC | Contained | *1 | 48.9 | 32 | 4.0 | 90 | *B | 20.4 | 10 | | *c | 29.2 | Ⓐ | 1.5 |
| 38 | PES | PVC | None | *1 | 48.9 | 32 | 4.0 | 90 | *D | 20.4 | 20 | | *c | 29.2 | Ⓐ | 1.5 |
| 39 | PES | — | — | *1 | 48.9 | 32 | 4.0 | 90 | *D | 18.6 | 20 | | *c | 27.6 | Ⓐ | 6.9 |
| 40 | Cotton | — | — | *1 | 48.9 | 32 | 4.0 | 90 | *D | 18.6 | 20 | | *c | 27.6 | Ⓐ | 6.9 |

Note for Table 9
PES: Polyester fibers
PVC: Polyvinyl chloride resin
*1: Hydrated silica pigment
*A: Cross-linked polyethyleneoxide polymer
*B: Cross-linked N-vinyl acetamide polymer
*D: Ethyleneoxide/propyleneoxide copolymer
*c: Acrylate ester polymer
Ⓐ: 2-(4-thiazolyl)benzimidazole
Ⓑ: 2-(thiocyanomethylthio)benzyothiazole
Ⓒ: 5-chlorobenzotriazole
Ⓓ: KABINON 100 (trademark)
Ⓔ: CS-100 (trademark)

TABLE 10

| | Item | | | | | | |
|---|---|---|---|---|---|---|---|
| | | Clarity of printed images | | | | Mildewproofness | |
| Example No. | Ink absorption | Reflected light images | Transmitted light images | Images after water resistance test | Appearance after abrasion test | Before water resistance test | After water resistance test |
| Example | | | | | | | |
| 30 | 4 | 3 | 4 | 4 | 4 | 1 | 2 |
| 31 | 4 | 3 | 4 | 4 | 4 | 1 | 2 |
| 32 | 4 | 3 | 4 | 4 | 4 | 1 | 2 |
| 33 | 4 | 3 | 4 | 4 | 3 | 1 | 1 |
| 34 | 4 | 3 | 4 | 4 | 3 | 1 | 1 |
| 35 | 4 | 3 | 4 | 4 | 3 | 1 | 1 |
| 36 | 4 | 3 | 4 | 4 | 4 | 1 | 2 |
| 37 | 4 | 3 | 4 | 4 | 4 | 1 | 2 |
| 38 | 4 | 3 | 4 | 4 | 4 | 1 | 2 |

TABLE 10-continued

| | Item | | | | | | |
|---|---|---|---|---|---|---|---|
| | | Clarity of printed images | | | | Mildewproofness | |
| Example No. | Ink absorption | Reflected light images | Transmitted light images | Images after water resistance test | Appearance after abrasion test | Before water resistance test | After water resistance test |
| 39 | 4 | 3 | 4 | 4 | 3 | 1 | 2 |
| 40 | 4 | 3 | 4 | 4 | 4 | 1 | 2 |

Tables 9 and 10 clearly shows that the advertisement sheet materials of Examples 30 to 40 in accordance with the present invention and having the ink receiving layer which comprises a hydrated silica particles having an average primary particle size of 15 to 35 nm, an average secondary particle size of 2 to 7 μm, and a BET specific surface area of 50 to 170 $m^2/g$, a water-holding material having a water absorption ratio of 5 to 50, an acrylic resin binder, and a mildewproofing agent comprising at least one member selected from imidazole compounds, thiazole compounds and triazole compounds can record transmitted light ink images having high clarity, water resistance and wear resistance without dripping the ink, and exhibit a high mildewproofness.

Example 41

A base fiber fabric consisting of a polyester filament mesh woven fabric having the weave structure:

$$\frac{250\ \text{denier} \times 250\ \text{denier}}{20\ \text{yarns}/25.4\ \text{mm} \times 20\ \text{yarns}/25.4\ \text{mm}}$$

was used. The front and back surfaces of the base fiber fabric were laminated each with a mildewproofing agent-containing white soft polyvinyl chloride resin film having a thickness of 0.2 mm and the following composition.

Composition of Film

| Component | Part by weight |
|---|---|
| Polyvinyl chloride resin | 100 |
| Plasticizer (dioctyl phthalate) | 40 |
| liquid flame-retarder (tricresyl phosphate) | 20 |
| Inorganic flame retarder (antimony trioxide) | 8 |
| Ba—Zn stabilizer | 2 |
| Titanium dioxide pigment | 4 |
| Mildewproofing agent (tetrachloroisophthalonitrile) | 0.2 |

The resultant sheet substrate exhibited an after flame time of 0 second, an after glow time of 0 second, a carbonized area of 12 $cm^2$, and thus passed the flame proofing test. Also, the sheet material exhibited a mildewproofness of class 2, and had a tensile strength of 48 kg/3 cm in each of the warp and weft directions, and a light transmission of 25%. To enhance the adhesion between the sheet substrate and an ink receiving layer, an acrylic adhesive (trademark: SC-474, made by SONY CHEMICAL K.K.) was coated on the front surface of the sheet substrate and dried to form a primer layer in an amount of 3 $g/m^2$ on the sheet substrate.

Separately, a coating liquid composition for the ink receiving layer was prepared in the following composition.

Composition for Ink Receiving Layer

| Component | Part by weight |
|---|---|
| Acrylate ester polymer emulsion having a solid content of 40% (trademark: AM-200, made by SHOWA KOBUNSHI K.K.) | 100 |
| Bisphenol A-bis (diphenyl phosphate) (Aromatic phosphate ester-condensation product) | 20 |
| Imidazole mildewproofing agent (2-(4-thiazolyl)benzimidazole) | 2 |
| Ethyleneoxide/propyleneoxide copolymer | 28 |
| Hydrated silica pigment (trademark: E-150J, made by NIPPON SILICA KOGYO K.K.) | 67 |

In the resultant composition, the solid contents of the acrylate ester polymer emulsion, the aromatic phosphate ester-condensation product, the mildewproofing agent, the ethyleneoxide/propyleneoxide copolymer and the hydrated silica pigment were respectively 25.5% by weight, 12.7% by weight, 1.3% by weight, 17.8% by weight and 42.7% by weight.

Also, in the ethyleneoxide/propylene oxide copolymer, the content of the copolymerized ethyleneoxide is 87% by weight, the weight average molecular weight was 900,000, and-the water absorption ratio was 20.

The hydrated silica pigment had an average primary particle size of 32 nm, an average secondary particle size of 4.0 μm, and a BET specific surface area of 90 $m^2/g$.

The coating liquid composition for the ink receiving layer was diluted with a mixed solvent consisting of water and isopropyl alcohol (in a mixing ratio of 1:1 by weight) in an amount of 3 times the weight of the coating liquid composition to provide a coating liquid for the ink receiving layer.

The coating liquid for the ink receiving layer was coated in a thickness of 100 μm on the primer layer by using an air knife coater and dried at a temperature of 120° C. to form an ink receiving layer having a thickness of 30 μm. A sheet material for advertisement was obtained.

The composition of the advertisement sheet material and the test results thereof are shown in Tables 11 and 12, respectively.

Example 42

An advertisement sheet material was produced and tested by the same procedures as in Example 41, with the following exceptions. In the coating liquid composition for the ink receiving layer, the aromatic phosphate ester flame retarder of Example 41 was replaced by resorcinol bis(diphenyl phosphate).

The composition and test results of the sheet material are shown in Tables 11 and 12, respectively.

Example 43

An advertisement sheet material was produced and tested by the same procedures as in Example 41, with the following exceptions. In the coating liquid composition for the ink receiving layer, the aromatic phosphate ester flame retarder of Example 41 was replaced by bisphenol A-tetracresyl phosphate.

The composition and test results of the sheet material are shown in Tables 11 and 12, respectively.

Example 44

An advertisement sheet material was produced and tested by the same procedures as in Example 30, with the following exceptions. In the coating liquid composition for the ink receiving layer, the mildewproofing agent of Example 41 was replaced by 2-(thiocyanomethylthio)benzothiazole (a tiazole compound mildewproofing agent).

The composition and test results of the sheet material are shown in Tables 11 and 12, respectively.

Example 45

An advertisement sheet material was produced and tested by the same procedures as in Example 41, with the following exceptions. In the coating liquid composition for the ink receiving layer, the mildewproofing agent of Example 41 was replaced by a trizole compound/silver composite mildewproofing agent (trademark: KABINON 200, made by TOA GOSEI K.K.) in an amount of 5% by weight.

The composition and test results of the sheet material are shown in Tables 11 and 12, respectively.

Example 46

An advertisement sheet material was produced and tested by the same procedures as in Example 41, with the following exceptions.

A high density cotton woven fabric having the weave structure shown below was used as a sheet substrate.

$$\frac{120^S \times 120^S}{78\ \text{yarns}/25.4\ \text{mm} \times 55\ \text{yarns}/25.4\ \text{mm}}$$

The resultant sheet substrate had an after flame time of 0 second, an after glow time of 0 second, a carbonized area of 15 $cm^2$ and thus passed the flameproofing test.

This sheet substrate also exhibited a mildewproofness of class 5 (worst).

A front surface of the sheet substrate was coated with the same ink receiving layer as in Example 41, except that no primer layer was coated on the sheet substrate and the imidazole compound mildewproofing agent was employed in an amount of 8 parts by weight.

In the coating liquid composition for the ink receiving layer, the solid contents of the acrylate ester polymer emulsion, the aromatic phosphate ester-condensation product, the mildewproofing agent, the ethyleneoxide/propyleneoxide copolymer and the hydrated silica pigment were respectively 24.5% by weight, 12.3% by weight, 4.9% by weight, 17.2% by weight and 41.1% by weight.

The composition and test results of the sheet material are shown in Tables 11 and 12, respectively.

Example 47

An advertisement sheet material was produced and tested by the same procedures as in Example 41, with the following exceptions.

A high density cotton woven fabric having the weave structure shown below was dip-treated with a mildewproofing agent for fibers (trademark: AMOLDEN HS, made by DAIWA KAGAKUKOGYO K.K.) comprising, as principal components, 2-methoxycarbonylaminobenzimidazole and 4'-n-dedecylbenzolsulfonate salt and dried, to provide a sheet substrate.

$$\frac{120^S \times 120^S}{78\ \text{yarns}/25.4\ \text{mm} \times 55\ \text{yarns}/25.4\ \text{mm}}$$

The resultant sheet substrate had an after flame time of 10 seconds or more, an after glow time of 10 seconds or more, a carbonized area of 60 $cm^2$ and thus could not pass the flameproofing test.

Also, the sheet substrate exhibited a mildewproofness of class 1 (best).

A front surface of the sheet substrate was coated with the same ink receiving layer as in Example 41, except that no primer layer was coated on the sheet substrate and the aromatic phosphate ester-condensation product was employed in an amount of 30 parts by weight.

In the coating liquid composition for the ink receiving layer, the solid contents of the acrylate ester polymer emulsion, the aromatic phosphate ester-condensation product, the mildewproofing agent, the ethyleneoxide/propyleneoxide copolymer and the hydrated silica pigment were respectively 24.0% by weight, 18.0% by weight, 1.2% by weight, 16.8% by weight and 40.0% by weight.

The composition and test results of the sheet material are shown in Tables 11 and 12, respectively.

TABLE 11

| Example No. | Sheet substrate: Base fiber fabric: Type of fiber | Base fiber fabric: Flame-retarder treatment | Base fiber fabric: Mildew-proof treatment | Synthetic resin coating layer: Type of resin | Synthetic resin coating layer: Flame retarder | Synthetic resin coating layer: Mildew proofing agent | Silica: Type | Silica: Amount (wt %) | Silica: Average primary particle size (nm) | Silica: Average secondary particle size (μm) | Silica: BET specific surface area ($m^2/g$) | Water-holding material: Type | Water-holding material: Amount (wt %) | Water-holding material: Water-absorption ratio |
|---|---|---|---|---|---|---|---|---|---|---|---|---|---|---|
| Example | | | | | | | | | | | | | | |
| 41 | PES | None | None | PVC | Contained | Contained | *1 | 42.7 | 32 | 4.0 | 90 | *D | 17.8 | 20 |
| 42 | PES | None | None | PVC | Contained | Contained | *1 | 42.7 | 32 | 4.0 | 90 | *D | 17.8 | 20 |
| 43 | PES | None | None | PVC | Contained | Contained | *1 | 42.7 | 32 | 4.0 | 90 | *D | 17.8 | 20 |
| 44 | PES | None | None | PVC | Contained | Contained | *1 | 42.7 | 32 | 4.0 | 90 | *D | 17.8 | 20 |
| 45 | PES | None | None | PVC | Contained | Contained | *1 | 42.0 | 32 | 4.0 | 90 | *D | 17.5 | 20 |
| 46 | Cotton | Applied | None | — | — | | *1 | 41.1 | 32 | 4.0 | 90 | *D | 17.2 | 20 |
| 47 | Cotton | None | Applied | — | — | | *1 | 40.0 | 32 | 4.0 | 90 | *D | 16.8 | 20 |

| Example No. | Resin binder: Type | Resin binder: Amount (wt %) | Flame retarder: Main: Type | Flame retarder: Main: Amount (wt %) | Flame retarder: Additional: Type | Flame retarder: Additional: Amount (wt %) | Mildewproofing agent: Type | Mildewproofing agent: Amount (wt %) |
|---|---|---|---|---|---|---|---|---|
| Example | | | | | | | | |
| 41 | *c | 25.5 | ① | 12.7 | — | — | Ⓐ | 1.3 |
| 42 | *c | 25.5 | ② | 12.7 | — | — | Ⓐ | 1.3 |
| 43 | *c | 25.5 | ③ | 12.7 | — | — | Ⓐ | 1.3 |
| 44 | *c | 25.5 | ① | 12.7 | — | — | Ⓑ | 1.3 |
| 45 | *c | 25.0 | ① | 12.5 | — | — | Ⓓ | 3.0 |
| 46 | *c | 24.5 | ① | 12.3 | — | — | Ⓐ | 4.9 |
| 47 | *c | 24.0 | ① | 18.0 | — | — | Ⓐ | 1.2 |

Note of Table 11
PES: Polyester fibers
PVC: Polyvinyl chloride resin
*1: Hydrated silica pigment
*D: Ethyleneoxide/propyleneoxide copolymer
*c: Acrylate ester polymer
①: Bisphenol-bis(diphenyl phosphate)
②: Resorcinol-bis(diphenyl phosphate)
③: Bisphenol A-tetracresyldiphenyl phosphate
Ⓐ: 2-(4-thiazolyl)benzimidazole
Ⓑ: 2-(thiocyanomethylthio)benzyothiazole
Ⓓ: KABINON 100 (trademark)

TABLE 12

| Example No. | Ink absorption | Clarity of images: Reflected light | Clarity of images: Transmitted light | Clarity of images: After water resistance test | Appearance after abrasion test | Flameproofness, Before water resistance test: After flame time (s) | Before: After glow time (s) | Before: Carbonized area ($cm^2$) | Before: Evaluation | Flameproofness, After water resistance test: After flame time (s) | After: After glow time (s) | After: Carbonized area ($cm^2$) | After: Evaluation | Mildewproofness: Before water resistance test | Mildewproofness: After water resistance test |
|---|---|---|---|---|---|---|---|---|---|---|---|---|---|---|---|
| Example | | | | | | | | | | | | | | | |
| 41 | 4 | 3 | 4 | 4 | 4 | 0 | 0 | 11.3 | Passed | 0.6 | 0.6 | 12.5 | Passed | 1 | 2 |
| 42 | 4 | 3 | 4 | 4 | 4 | 0 | 0 | 13.2 | Passed | 1.1 | 1.1 | 14.3 | Passed | 1 | 2 |
| 43 | 4 | 3 | 4 | 4 | 4 | 0 | 0 | 13.9 | Passed | 0.8 | 0.8 | 18.2 | Passed | 1 | 2 |
| 44 | 4 | 3 | 4 | 4 | 4 | 0 | 0 | 12.4 | Passed | 1.3 | 1.3 | 14.9 | Passed | 1 | 2 |
| 45 | 4 | 3 | 4 | 4 | 3 | 0 | 0 | 14.1 | Passed | 0.9 | 0.9 | 15.7 | Passed | 1 | 1 |
| 46 | 4 | 3 | 4 | 4 | 3 | 0 | 0 | 17.2 | Passed | 1.4 | 1.4 | 19.4 | Passed | 2 | 2 |
| 47 | 4 | 4 | 3 | 3 | 3 | 0 | 0 | 22.7 | Passed | 2.3 | 2.3 | 25.1 | Passed | 1 | 2 |

Tables 11 and 12 clearly show that the advertisement sheet materials of Examples 41 to 47 in accordance with the present invention and having the ink receiving layer which comprises a hydrated silica particles having an average primary particle size of 15 to 35 nm, an average secondary particle size of 2 to 7 $\mu$m, and a BET specific surface area of 50 to 170 $m^2$/g, a water-holding material having a water absorption ratio of 5 to 50, an acrylic resin binder, a phosphate ester flame retarder and a mildewproofing agent comprising at least one member selected from imidazole compounds, thiazole compounds and triazole compounds can record transmitted light ink images having high clarity, water resistance and wear resistance without dripping the ink, and exhibit a high mildewproofness and a flameproofness.

The sheet material for advertisement of the present invention can record thereon ink images having high quality by an ink jet printing method. The printed ink image exhibit a high clarity and sharpness when displayed by the light transmitted through the sheet material, namely, by a internal lighting display system for advertisement. The sheet material of the present invention has a high water resistance and durability in practical use and optionally a high flame retardant (flameproof) property and a high mildewproof property. Thus, the sheet material of the present invention is advantageously employed for large surface area outdoor advertisement sheets, building, protecting and display sheets with advertisement, truck cover sheets, sunlight-shielding sheet, tent eaves and hanging sheets.

We claim:

1. A sheet material for advertisement comprising:

(A) a sheet substrate comprising at least one base fiber fabric; and (B) at least one ink receiving layer formed on at least one surface of the sheet substrate and comprising:

(a) hydrated silica particles having an average primary particle size of 20 to 35 nm, an average secondary particle size of 2 to 7 $\mu$m, and a BET specific surface area of 50 to 170 $m^2$/g, and (b) a cross-linked water-holding material having a water-absorption ratio of 5 to 50, determined in accordance with the following equation: water absorption ratio=$W_2/W_1$, wherein $W_1$ represents a weight of a water-holding material when it is free of water and $W_2$ represents a weight of the water-holding material when it is saturated with water;

(c) a binder comprising an acrylic resin, wherein the ink receiving layer further comprises a flame-retarder containing a phosphate ester compound.

2. The sheet material for advertisement as claimed in claim 1, wherein the sheet substrate (A) further comprises at least one resinous coating layer, one of which is formed between the base fiber fabric and the ink receiving layer, comprising a synthetic resin.

3. The sheet material for advertisement as claimed in claim 1, wherein the base fiber fabric for the sheet substrate (A) comprises at least one type of fiber selected from the groups consisting of natural organic fibers, inorganic fibers, regenerated fibers, semi-synthetic fibers and synthetic fibers.

4. The sheet material for advertisement as claimed in claim 1, wherein the base fabric for the sheet substrate (A) is one to which a flame retardant treatment has been attached.

5. The sheet material for advertisement as claimed in claim 1, wherein the base fabric for the sheet substrate (A) comprises at least one member selected from the group consisting of cotton fabrics and polyester fiber fabrics.

6. The sheet material for advertisement as claimed in claim 5, wherein the cotton fabric contained in the base fiber fabric for the sheet substrate (A) is one to which a flame retardant treatment has been applied.

7. The sheet material for advertisement as claimed in claim 3, wherein the synthetic fibers for the base fiber fabric for the sheet substrate (A) are selected from the flame retardant synthetic fiber group consisting of polyvinyl chloride fibers, polyvinylidene chloride fibers, fluorine-containing synthetic fibers, aramid fibers, novoloid fibers, polyarylate fibers, polybenzimidazole; fibers, polyphenylene triazole fibers, polyoxadiazole fibers, polyimide fibers, polyamideimide fibers, polyetherimide fibers, polyetheretherketone fibers, polyphenyleneoxide fibers, polyphenylenesulfide fibers, poly-p-phenylene benzobisoxazole fibers, and poly-p-phenylene benzobis-thiazole fibers.

8. The sheet material for advertisement as claimed in claim 3, wherein the regenerated fibers, semi-synthetic fibers and synthetic fibers for the base fiber fabric for the sheet substrate (A) contain a flame retarder mixed into the fibers.

9. The sheet material for advertisement as claimed in claim 3, wherein the natural organic fibers, regenerated fibers, semi-synthetic fibers and synthetic fibers for the base fiber fabric for the sheet substrate (A) are those to which a flame retardant treatment has been applied.

10. The sheet material for advertisement as claimed in claim 3, wherein the base fiber fabric for the sheet substrate (A) comprises at least one type of fibers selected from the flame retardant-modified fiber group consisting of flame retardant rayon fibers, flame retardant acrylic fibers, flame retardant water-insolubilized polyvinyl alcohol fibers, polychlal fibers, flame retardant polyester fibers, and flame retardant polyurethane fibers.

11. The sheet material for advertisement as claimed in claim 2, wherein the resinous coating layer for the sheet substrate (A) comprises at least one member selected from flame retardant synthetic resins and mixtures of synthetic resins with flame retarders.

12. The sheet material for advertisement as claimed in claim 1, wherein the water-holding material (b) comprises at least one member selected from the group consisting of (1) polymers produced by a reaction of isocyanate compounds with polyalkylene oxide compounds and having a three dimensionally cross-linked structure, (2) polymers produced by an addition polymerization reaction of isocyanate compounds with N-vinyl acetamide and having a three dimensionally cross-linked structure, and (3) modified polyalkyleneoxide resin comprising at least one member selected from copolymers and reaction products of 65% by weight or more of a polymeric component comprising at least one homopolymer or copolymer of at least one alkyleneoxide with 35% by weight or less of a modifying component comprising at least on organic compound component for modifying the polymeric component.

13. The sheet material for advertisement as claimed in claim 12, wherein the modified polyalkyleneoxide resin comprises at least one member selected from the group consisting of:

(a) reaction products with ethyleneoxide polymers with hydrophobic organic compounds having at least one active hydrogen atom-containing group per molecule, (b) polyhydroxyl compounds produced by reaction of ethyleneoxide polymers with hydrophilic organic compounds having at least two active hydrogen atom-containing groups per molecule, (c) reaction products of the above-mentioned polyhydroxyl compounds (b) with at least one member selected from the group consisting of dicarboxylic acids, dicarboxylic anhydrides, lower alkyl esters of the above-mentioned dicarboxylic acids, and diisocyanate compounds, and (d) ethyleneoxide-propyleneoxide copolymers having a content of the copolymers having a content of the copolymerized polyethyleneoxide of 65 to 95% by weight and a weight average molecular weight of 200,000 or more.

14. The sheet material for advertisement as claimed in claim 1, wherein the phosphate ester-containing flame retarder comprises an aromatic phosphate ester compound in the chemical structure of an oligomer.

15. The sheet material for advertisement as claimed in claim 1, wherein the sheet substrate (A) comprises at least one member selected from the group consisting of (1) base fiber fabric comprising at least one type of fibers selected from the group consisting of flame retardant synthetic fibers, flame retarder-containing synthetic fibers and flame-retardant-treated synthetic fibers and flame retardant-treated base fiber fabrics, and (2) base fiber fabrics coated with a flame retardant resinous coating layer comprising at least one member selected from the group consisting of flame retardant synthetic resins and flame retarder-containing synthetic resins; and the ink receiving layer further comprises, in addition to the hydrated silica particles, the water-holding material and the acrylic resin binder, a flame retarder comprising a phosphate ester compound.

16. The sheet material for advertisement as claimed in claim 1, wherein the ink receiving layer (B) further comprises a mildewproofing agent.

17. The sheet material for advertisement as claimed in claim 1, wherein the flame retarder-containing ink receiving layer (B) further comprises a mildewproofing agent.

18. The sheet material for advertisement as claimed in claim 2, wherein the resinous coating layer further comprises a mildewproofing agent.

19. The sheet material for advertisement as claimed in claim 11, wherein the flame retardant resinous coating layer further comprises a mildewproofing agent.

20. The sheet material for advertisement as claimed in claim 1, wherein the base fiber fabric for the sheet substrate (A) further comprises a mildewproofing agent.

21. The sheet material for advertisement as claimed in claim 4, wherein the flame retardant base fiber fabric further comprises a mildewproofing agent.

22. The sheet material for advertisement as claimed in claim 16, 17, 18, 19, 20 or 21, wherein the mildewproofing agent comprises at least one member selected from the group consisting of mildewproofing imidazole compounds, thiazol compounds and triazol compounds.

23. The sheet material for advertisement as claimed in claim 16, 17, 18, 19, 20 or 21, wherein the mildewproofing agent comprises a composite comprising (i) at least one member selected from the group consisting of mildewproofing imidazole compounds, thiazol compounds and triazole compounds and (ii) at least one inorganic metal and/or at least one inorganic oxide compound.

* * * * *

UNITED STATES PATENT AND TRADEMARK OFFICE

CERTIFICATE OF CORRECTION

PATENT NO. : 6,589,633 B1
DATED : July 8, 2003
INVENTOR(S) : Kazuhide Ino et al.

It is certified that error appears in the above-identified patent and that said Letters Patent is hereby corrected as shown below:

Title page, Item [54] and Column 1, lines 1 and 2,
Please change the title to read as follows:
-- INK-RECEPTIVE SHEET MATERIAL FOR ADVERTISEMENT --.

Signed and Sealed this

Sixth Day of January, 2004

JAMES E. ROGAN
*Director of the United States Patent and Trademark Office*